(12) United States Patent
Lang et al.

(10) Patent No.: US 11,396,254 B2
(45) Date of Patent: *Jul. 26, 2022

(54) RAILCAR-MOVER VEHICLE

(71) Applicant: CUSTOM TRUCK & EQUIPMENT LLC, Kansas City, MO (US)

(72) Inventors: Scott Allen Lang, Olathe, KS (US); Dwight Johannes Thelwell, Lee's Summit, MO (US)

(73) Assignee: CUSTOM TRUCK & EQUIPMENT LLC, Kansas City, MO (US)

( * ) Notice: Subject to any disclaimer, the term of this patent is extended or adjusted under 35 U.S.C. 154(b) by 216 days.

This patent is subject to a terminal disclaimer.

(21) Appl. No.: 16/913,774

(22) Filed: Jun. 26, 2020

(65) Prior Publication Data

US 2020/0324682 A1 Oct. 15, 2020

Related U.S. Application Data

(63) Continuation-in-part of application No. 15/697,528, filed on Sep. 7, 2017, now Pat. No. 10,696,113.

(51) Int. Cl.
*B60F 1/00* (2006.01)
*B60P 3/06* (2006.01)

(52) U.S. Cl.
CPC ............... *B60P 3/068* (2013.01); *B60F 1/00* (2013.01)

(58) Field of Classification Search
CPC .. B60F 1/04; B60F 1/043; B60F 1/005; B60F 1/00; B60P 3/068
See application file for complete search history.

(56) References Cited

U.S. PATENT DOCUMENTS

| | | |
|---|---|---|
| 1,489,998 A | 4/1924 | Galbraith |
| 3,019,742 A | 2/1962 | Knox et al. |
| 3,263,628 A | 8/1966 | Grove |
| 4,048,925 A | 9/1977 | Storm |
| 4,240,354 A | 12/1980 | Newman |
| 4,266,483 A | 5/1981 | Rannanmaki et al. |
| 4,372,220 A | 2/1983 | Sechi |
| 4,488,494 A | 12/1984 | Powell |
| 4,520,735 A | 6/1985 | Field |
| 4,583,465 A | 4/1986 | Powell |

(Continued)

FOREIGN PATENT DOCUMENTS

| | | |
|---|---|---|
| CA | 1338103 | 3/1996 |
| CA | 2446484 | 4/2004 |

(Continued)

*Primary Examiner* — Scott A Browne
(74) *Attorney, Agent, or Firm* — Lathrop GPM LLP

(57) ABSTRACT

Disclosed herein is a railcar-moving vehicle having a highway mode for operation on roadways, and a rail mode for operation on rails. The railcar-moving vehicle including a support system, at least one drive axle with rubber tried drive wheels, and at least one pair of steering tires and two spaced apart rail bogies suspended by the support system. The railcar-moving vehicle including a weighted sled frame slidably mounted to the support system, the sled frame translatable between the front end and the rear end of the support system for optimizing weight distribution for increasing traction by the bogies when in rail mode. The bogies retained in an elevated and stowed position during highway mode and in a lowered position when in rail mode.

7 Claims, 23 Drawing Sheets

(56) References Cited

U.S. PATENT DOCUMENTS

| | | | |
|---|---|---|---|
| 4,708,066 | A | 11/1987 | Heckman |
| 4,843,973 | A | 7/1989 | Hartelius et al. |
| 4,878,436 | A | 11/1989 | Lich et al. |
| 4,981,082 | A | 1/1991 | Wicks et al. |
| 5,016,544 | A | 5/1991 | Woollam et al. |
| 5,103,740 | A | 4/1992 | Masse et al. |
| 5,156,639 | A | 10/1992 | Bostrom |
| 5,168,815 | A | 12/1992 | Comer et al. |
| 5,301,615 | A | 4/1994 | Evans et al. |
| 5,619,931 | A | 4/1997 | Madison et al. |
| 5,740,742 | A | 4/1998 | Bush |
| 5,802,980 | A | 9/1998 | Hofmiller |
| 5,868,078 | A | 2/1999 | Madison |
| 6,021,719 | A | 2/2000 | Kershaw |
| 6,298,792 | B1 | 10/2001 | Jackson, Jr. |
| 6,324,993 | B1 | 12/2001 | Jacob |
| 6,352,035 | B1 | 3/2002 | Kashiwase et al. |
| 6,786,158 | B2 | 9/2004 | Jacob |
| 6,976,432 | B2 | 12/2005 | Jacob |
| 6,988,451 | B2 | 1/2006 | Marcotte et al. |
| 7,201,106 | B2 * | 4/2007 | Whiston ................ B61D 15/00  105/72.2 |
| 7,406,919 | B2 | 8/2008 | Coots |
| 8,061,277 | B2 | 11/2011 | Jacob |
| 8,316,774 | B1 | 11/2012 | Coots |
| 8,505,464 | B2 | 8/2013 | Huber et al. |
| 8,863,670 | B2 | 10/2014 | Jackson |
| 9,682,600 | B2 | 6/2017 | Claypool |
| 10,696,113 | B2 * | 6/2020 | Lang ...................... B60F 1/005 |
| 2004/0008919 | A1 | 1/2004 | Freeman et al. |
| 2005/0016678 | A1 | 1/2005 | Kurosawa |
| 2005/0020494 | A1 | 1/2005 | Carr et al. |
| 2005/0021753 | A1 | 1/2005 | Coleman |
| 2014/0026106 | A1 | 1/2014 | Yang et al. |
| 2015/0000055 | A1 | 1/2015 | Togawa et al. |
| 2015/0020293 | A1 | 1/2015 | Stiles |

FOREIGN PATENT DOCUMENTS

| | | |
|---|---|---|
| CA | 2434367 | 12/2004 |
| CA | 2482709 | 3/2006 |
| CA | 2521978 | 3/2006 |
| CA | 2510233 | 12/2006 |
| CA | 2510237 | 12/2006 |
| CA | 2808500 | 9/2014 |
| CA | 2809081 | 9/2014 |
| CA | 2809692 | 9/2014 |
| CA | 2809950 | 9/2014 |

\* cited by examiner

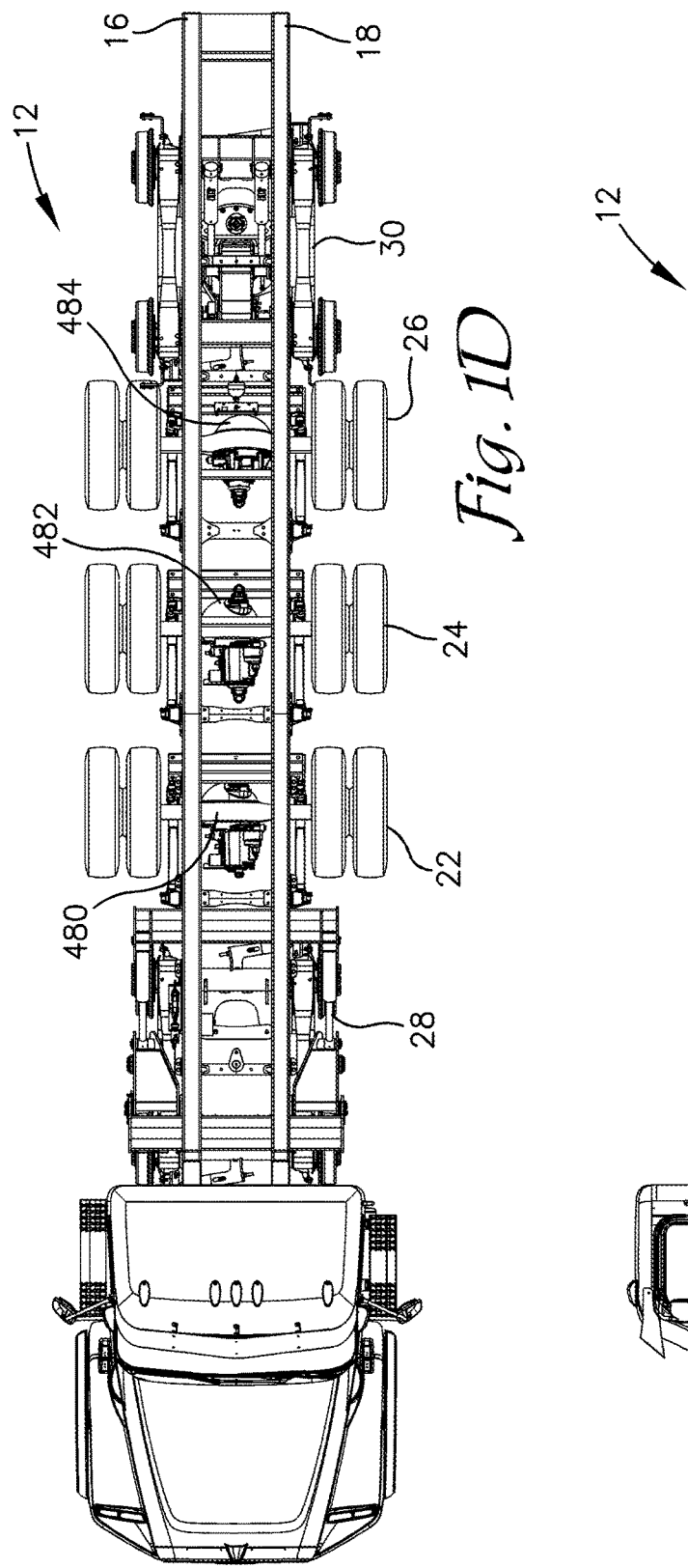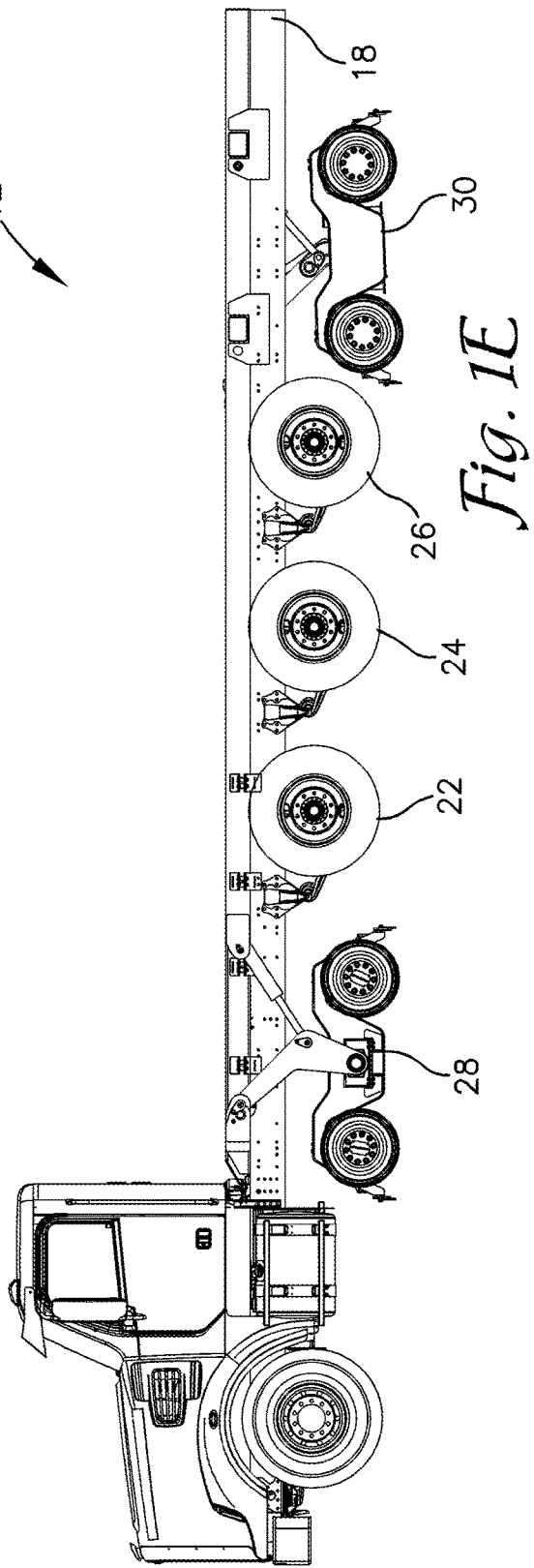

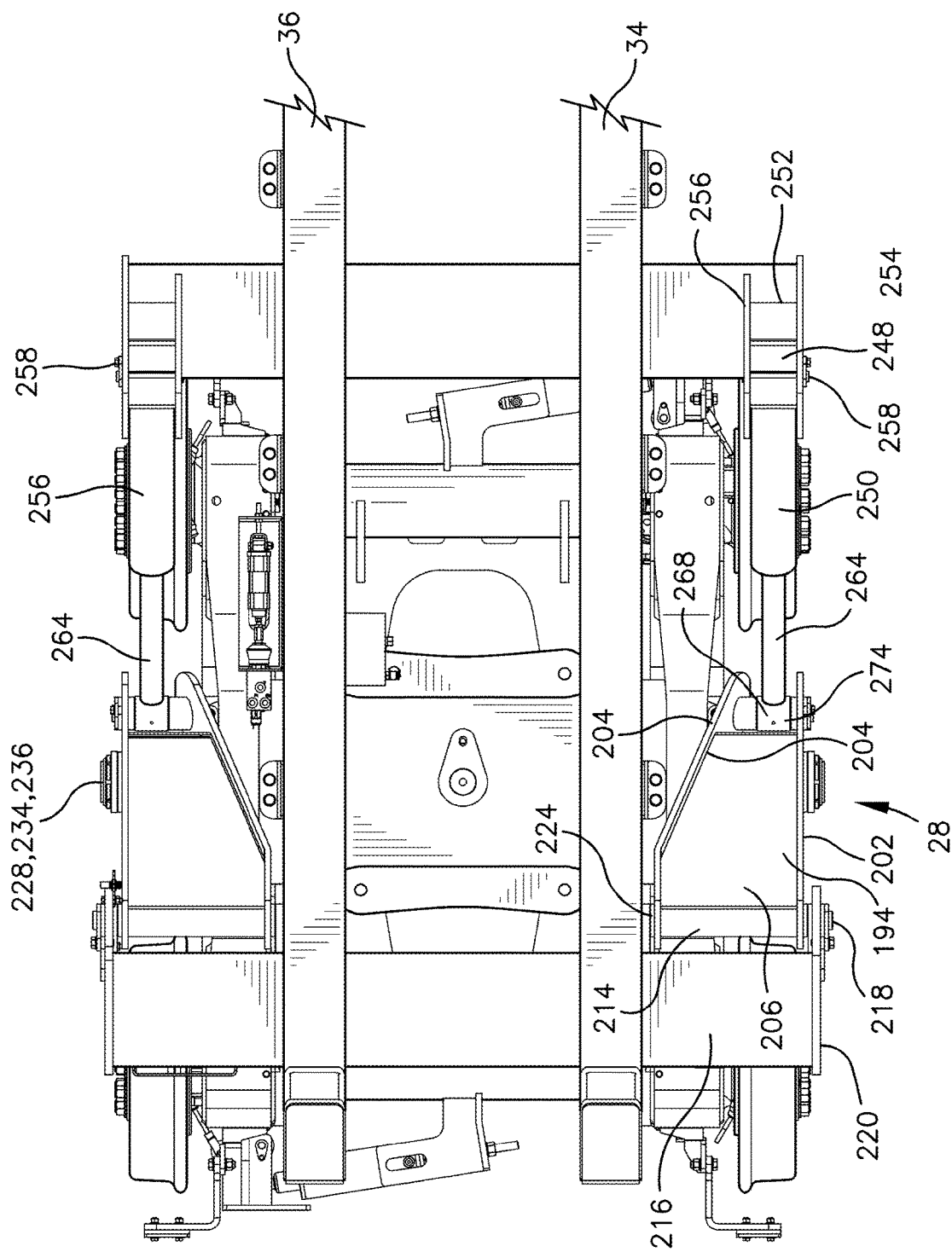

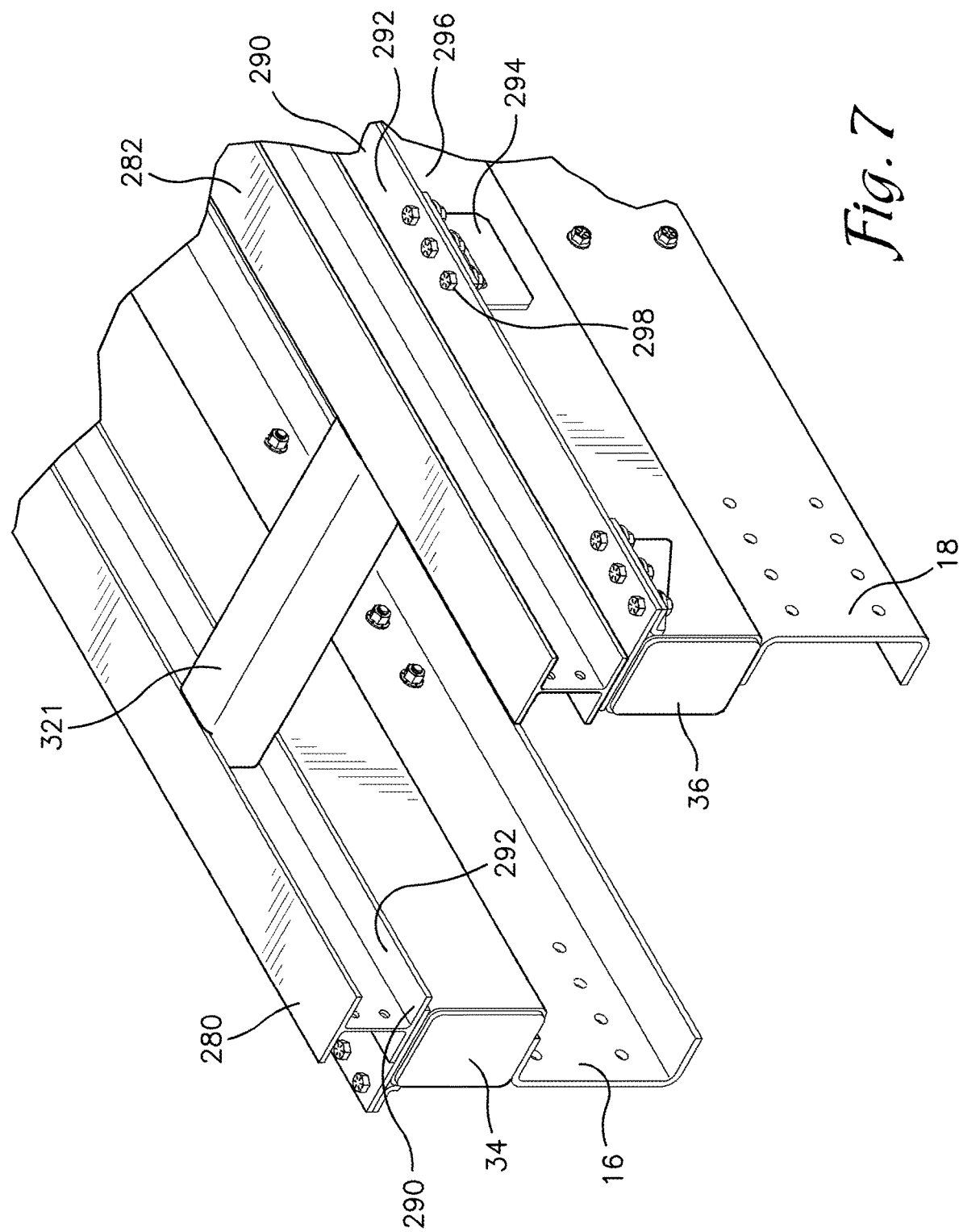

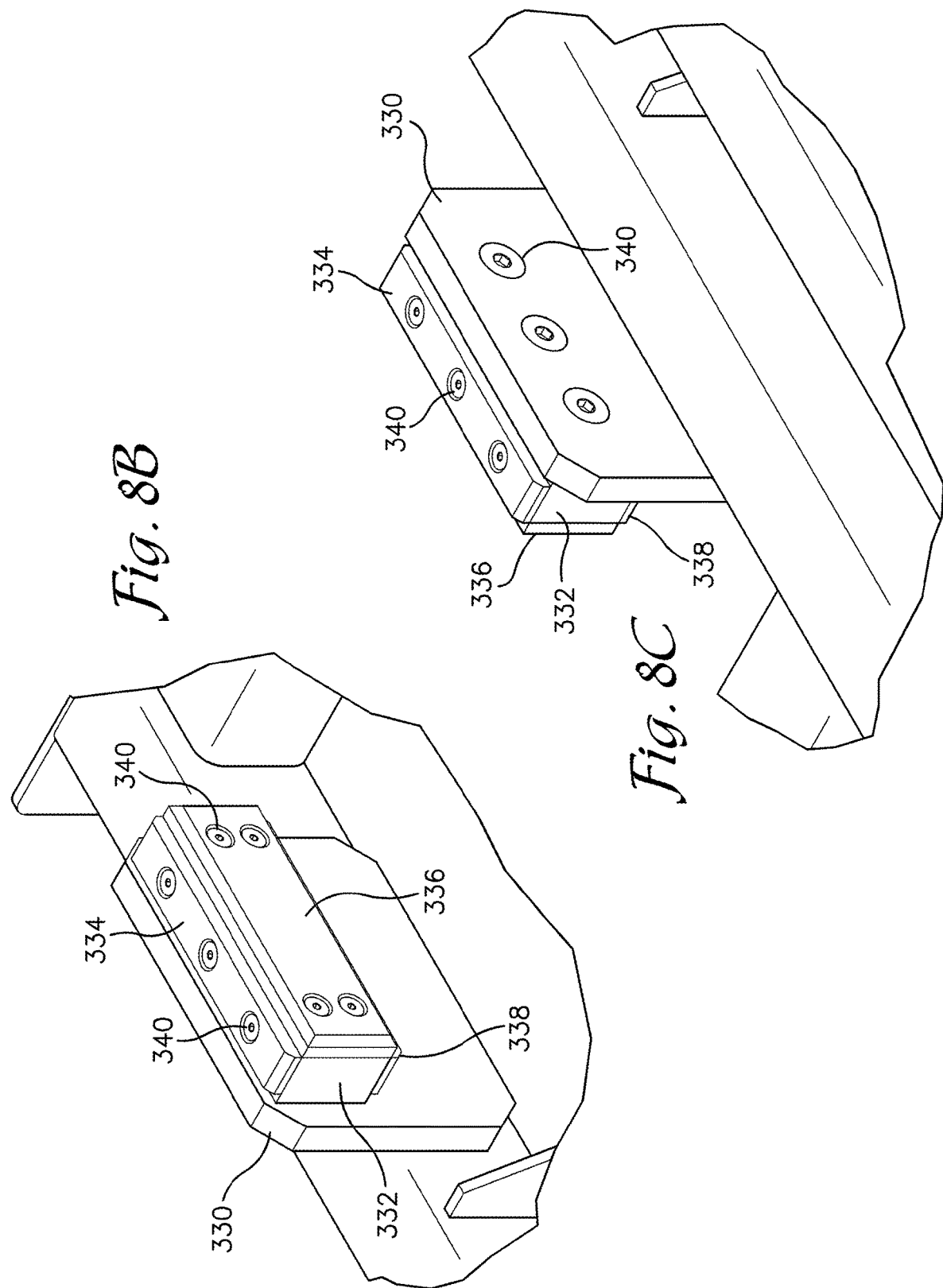

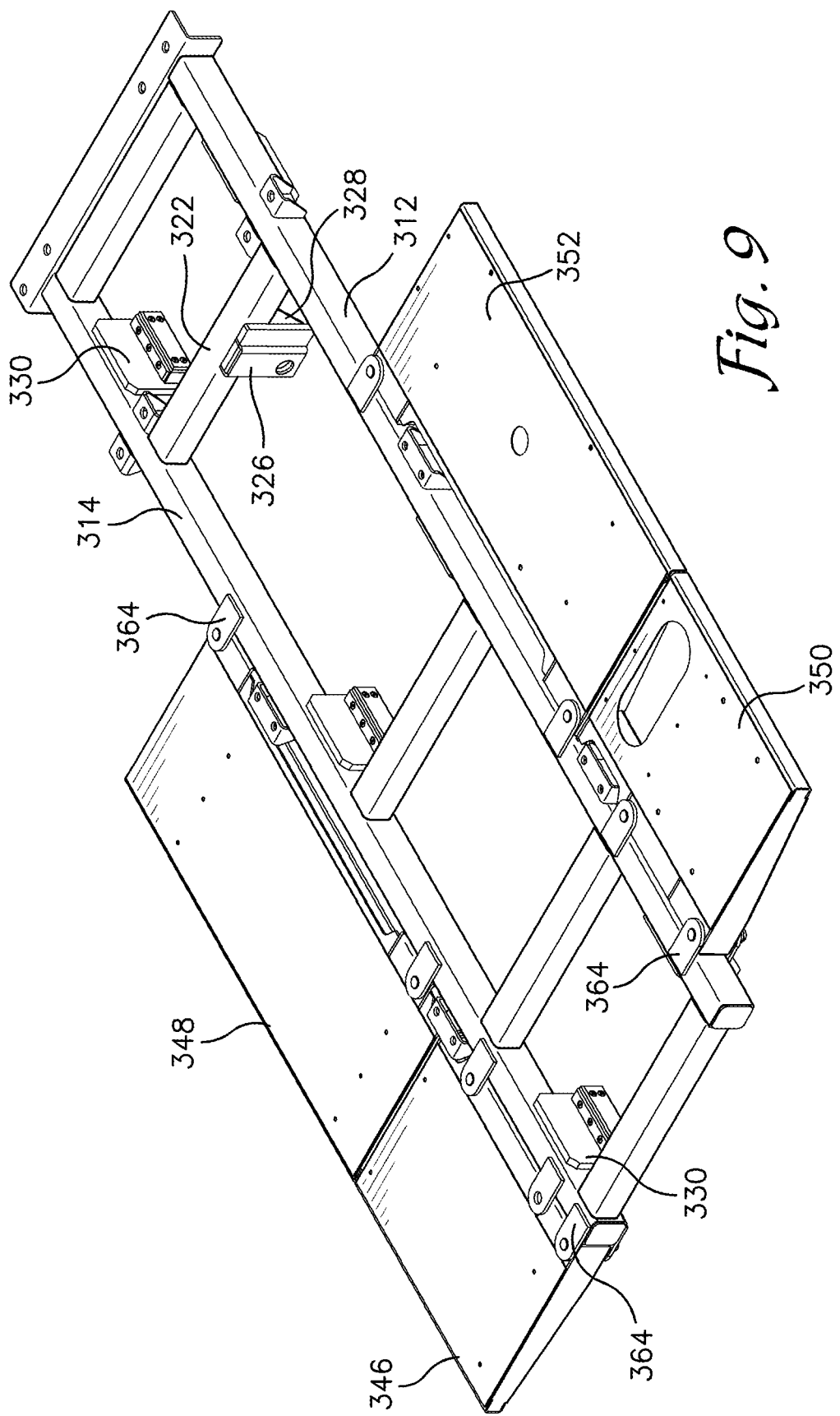

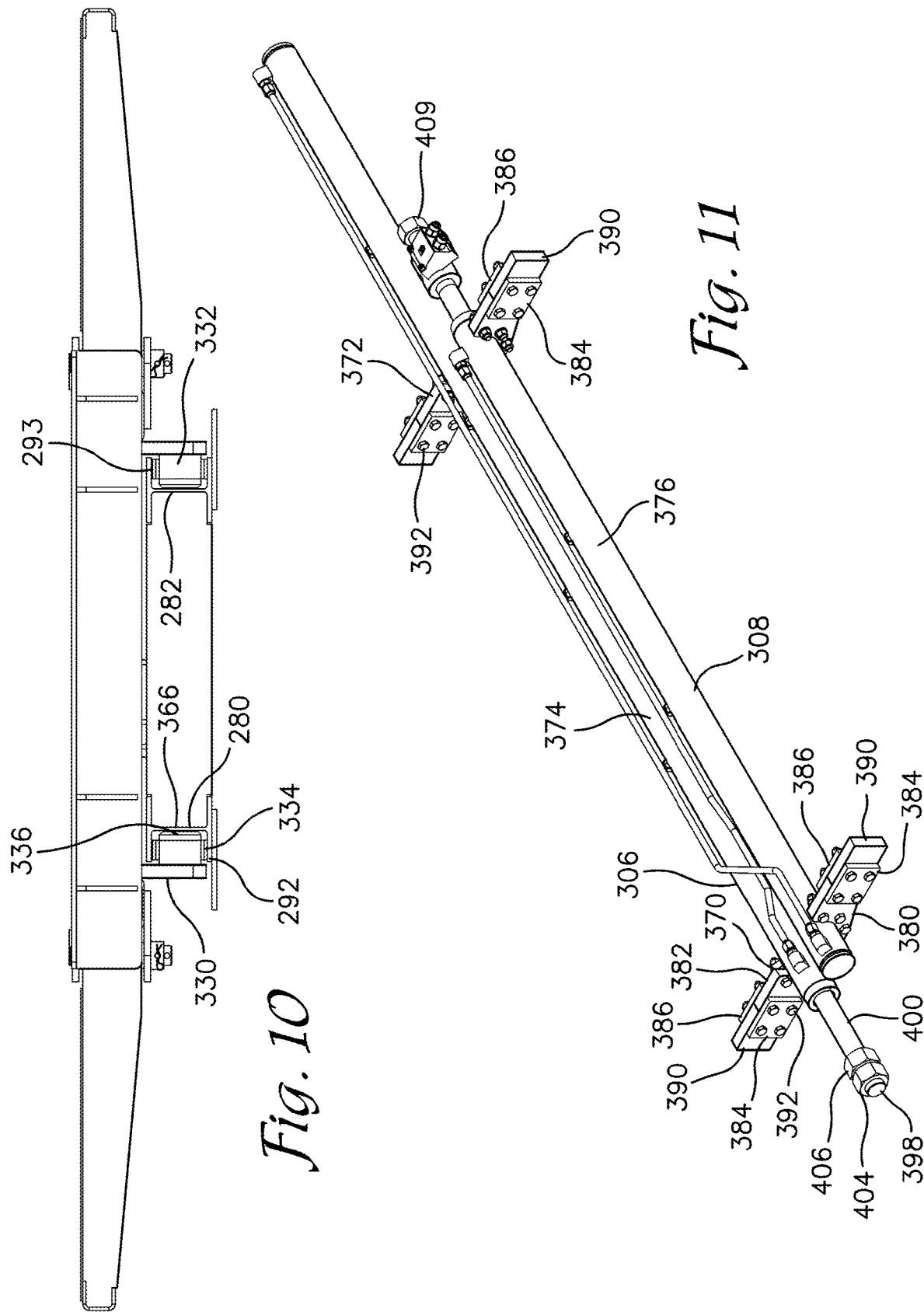

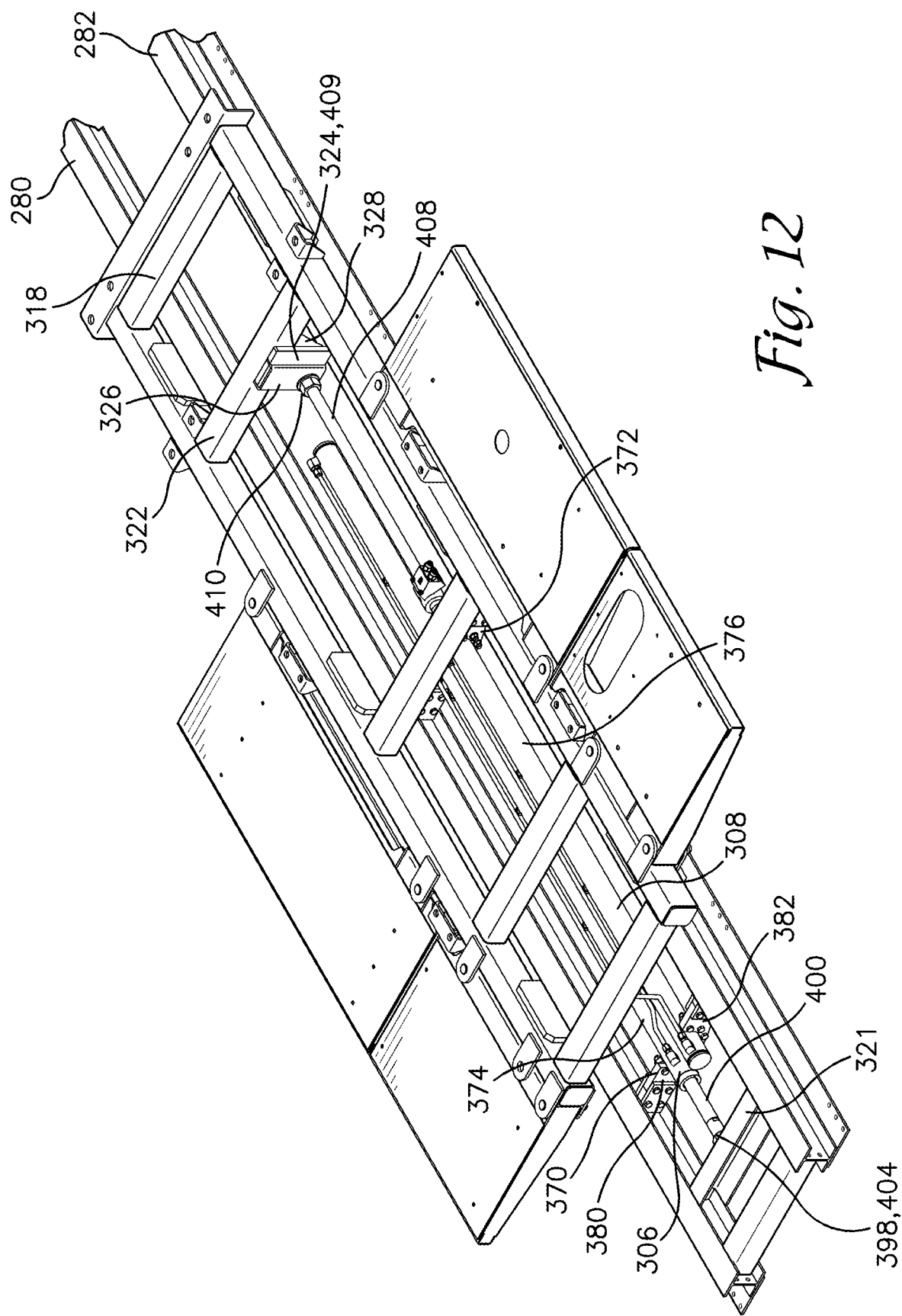

RAILCAR-MOVER VEHICLE

RELATED APPLICATION

Continuation-in-part of application Ser. No. 15/697,528 filed on Sep. 7, 2017.

TECHNICAL FIELD

This disclosure relates to a road-rail vehicle. More particularly, it relates to an improved road-rail vehicle capable of traveling by road at normal highway speeds as well as traveling by rail.

BACKGROUND ART

Road-rail vehicles which are operable on both roadways and highways are known and used in the rail industry for ferrying railcars from one location to the next. Units capable of self-propulsion on both highways and railways which embody a source of power for movement and which are also configured to provide for the selective attachment, support and conveyance of various types of maintenance equipment so the one unit may be universally applicable for carrying out a wide variety of maintenance and construction operations are in great demand by the railroad industry. In addition, these road-rail vehicles are highly desirable when they are capable of coupling and moving railcars, or even locomotives, that are sidelined due to maintenance issues or for other reasons as they can decrease the demand for and utilization of locomotives and engineers that are generally already heavily utilized.

Multi-purpose vehicles that are capable of towing railcars and that rely upon the use of the rubber road tires to maintain contact with the rails to provide motive power tend to require frequent tire replacement due to extreme abrasion of a narrow portion of the tires because of slippage on the rails. In addition, vehicles configured for towing that are driven by the rubber road tires on the rails tend to regularly overheat the vehicle transmission resulting in costly premature replacement or major overhauls of the transmission units.

Road-rail units that can be quickly dispatched via roadways to a location that is proximate to a railway with a railcar or locomotive that must be relocated due to a maintenance issue can be far more cost effective than sending a locomotive. The utilization of a switching locomotive and one or more engineers to travel to the location of the railcar or locomotive that must be shuttled to a repair facility greatly exceeds the hourly cost of operation of a road-rail unit. The road-rail unit may also be capable of providing the repairs at the point of breakdown due to the availability of robust maintenance equipment carried upon the road-rail unit. Moreover, the cost of personnel to operate the road-rail unit is considerably less than the cost of personnel trained and certified to operate a switching locomotive and the hourly cost of operation of a road-rail unit will generally be far less than the hourly cost of operating a locomotive. Costs associated with retrieval, or a repair operation can mount quickly if the location of the railcar, locomotive or railway in need of repair is distant and requires considerable transit time.

SUMMARY

The railcar-mover vehicle was developed out of a need for a vehicle for moving railcars, which would satisfy the requirements of today's rail industry. While other products are currently in existence for performing the functions of the railcar-mover vehicle the vehicle disclosed herein improves on well-known weaknesses and problem areas in the existing market.

The vehicle disclosed herein comprises at its core a modified commercial truck. The railcar-moving vehicle is capable of operation on roadways and operation on rails. The railcar-moving vehicle includes a support system with a front end and a rear end, at least one drive axle with two rubber drive tires, and at least one pair of steering tires as well as a sled frame slidably mounted to the support system that is translatable between the front end and the rear end of the support system. The railcar-mover vehicle is optimized to provide a high level of reliable tractive effort while moving railcars.

The tractive force is preferably provided by hydrostatically driven rail bogies or alternatively electric drive bogies. The bogies also provide braking when the railcar mover vehicle needs to be stopped while on the rails. Various embodiments of the bogies may be utilized wherein the bogies are comprised of one or more wheelsets. In a preferred embodiment the forward bogie is mounted to the support system forward on the railcar moving vehicle between the steering tires and the one or more drive axles. The second bogie is mounted to the support system at the rear of the support system behind the one or more drive axles and the associated rubber drive tires. An alternative embodiment includes a forward bogie mounted in front of the cab and a rear bogie mounted behind the one or more drive axles.

In a preferred operational configuration of the vehicle, the bogies are retained in an elevated and stowed position during highway mode and in a lowered position with the wheelsets in contact with the rails when in rail mode. In the preferred operational configuration the rubber drive tires remain out of contact with the rails with the possible assistance of axle restraints while the bogie wheelsets are in contact with the rails.

In a second operational configuration of the vehicle, the rubber drive tires remain in contact with the rails when starting movement to provide additional traction, beyond that provided by the front and rear bogies in order to pull more railcars or to pull more heavily loaded railcars. It is during the initiation of movement of the railcar-mover vehicle heavily laden with one or more railcars that the greatest traction between the wheelsets and the rails is required. Once the load is started, the operator may choose to raise the rubber tires to the preferred operational configuration to lessen their wear.

In a third operational configuration of the vehicle, the bogies and rubber drive tires initiate movement of the towed railcars thereby maximizing the pulling power of the vehicle. As the vehicle gains speed the drive motors in the bogies are disengaged and the bogie wheelsets freewheel along the rails with tractive power provided solely by the rubber drive tires. This operational configuration is generally least preferred as it results in operation with the same weaknesses as the current art. That is, it places the greatest stress on the truck transmission and the rubber drive tires. This configuration; however, achieves the highest rail speed as the rubber drive tires, with the bogie wheelsets disengaged, are capable of propelling the vehicle at the greatest speed along the rails and may be advantageous for transit or emergency operations with no cargo load.

The sled frame's function is to aid in optimizing weight distribution over the bogies of the railcar mover, depending on operational conditions. The operator of the railcar mover vehicle optimizes weight distribution, and consequently traction, by repositioning the movable sled frame and the associated operational equipment mounted thereon. For example, in moving one or more heavily loaded railcars, the sled frame and associated equipment are moved rearward or forward as necessary to apply additional weight over a specific bogie. The sled frame may be moved anywhere along the range of the sled.

One of the primary objectives of the sled frame is to place as much weight onto the bogie system wheels as possible during rail operation to eliminate, or at least minimize, slippage between the wheels and the rail when the forward and rear bogie wheelsets are placed into drive mode. If, for example, the rear bogie wheels are slipping on the rails due to the load of one or more railcars, then the sled frame and associated equipment mounted thereon can be moved to apply additional weight anywhere along the range of the sled.

Various objects, features, aspects and advantages of the disclosed subject matter will become more apparent from the following detailed description of preferred embodiments, along with the accompanying drawings in which like numerals represent like components. The contents of this summary section are provided only as a simplified introduction to the disclosure, and are not intended to be used to limit the scope of the appended claims.

BRIEF DESCRIPTION OF THE DRAWINGS

FIG. 1D is a plan view of an embodiment of the railcar moving vehicle with only bogies in position;

FIG. 1E is an elevation view of an embodiment of the railcar moving vehicle with only bogies in position;

FIG. 6B is a plan view of an embodiment of the forward bogie mounted to the railcar moving vehicle;

FIG. 7 is a left side perspective view of an embodiment of the rear bogie mounted to the railcar moving vehicle;

FIG. 8B is a front facing perspective view of an embodiment of a sled pad plate with nylon friction pads attached thereto;

FIG. 8C is a rear facing perspective view of an embodiment of a sled pad plate with nylon friction pads attached thereto;

FIG. 9 is a topside perspective view of an embodiment of a sled frame with associated platform panels mounted thereto;

FIG. 10 is an end view of an embodiment of the friction pads of a sled frame engaged with the outboard flanges and web of the weldment tracks;

FIG. 11 is a perspective view of an embodiment of piggybacked hydraulic actuators and the friction pads extending outwardly from the actuator cradles;

FIG. 12 is a perspective view of an embodiment of a sled frame mounted atop weldment tracks;

DEFINITIONS

"Bogie" is defined as a chassis or framework with one or more wheelsets, wherein the wheelsets comprise two wheels that may be connected by an axle or alternatively one or more of the wheels may be independently driven by a drive motor.

DETAILED DESCRIPTION

For purposes of assisting in the identification of the location of various components described herein the cab area of the disclosed railcar mover vehicle will be termed the front end of the vehicle and the distal ends of the frame rails, fully opposite the cab, is identified as the rear end of the railcar mover vehicle. Future references to front and rear throughout this description will provide the reader with a frame of reference as to the location of the component relative to other components.

The foundation of the railcar mover vehicle 10 described herein begins with a conventional straight truck 12 purchased from vendors such as Freightliner®, Peterbilt® and other companies that specialize in the production of straight trucks. The railcar mover vehicle is custom assembled, or "upfitted," upon the conventional straight truck. Exemplary embodiment(s) of the vehicle 10 are described below with reference to the attached drawings. While on road the railcar mover is powered by the chassis engine. The chassis engine output must be capable of powering the truck 12 as well as transporting the equipment loaded upon the sled frame which in total has an operational weight in excess of 60,000 pounds.

Figure 1A:
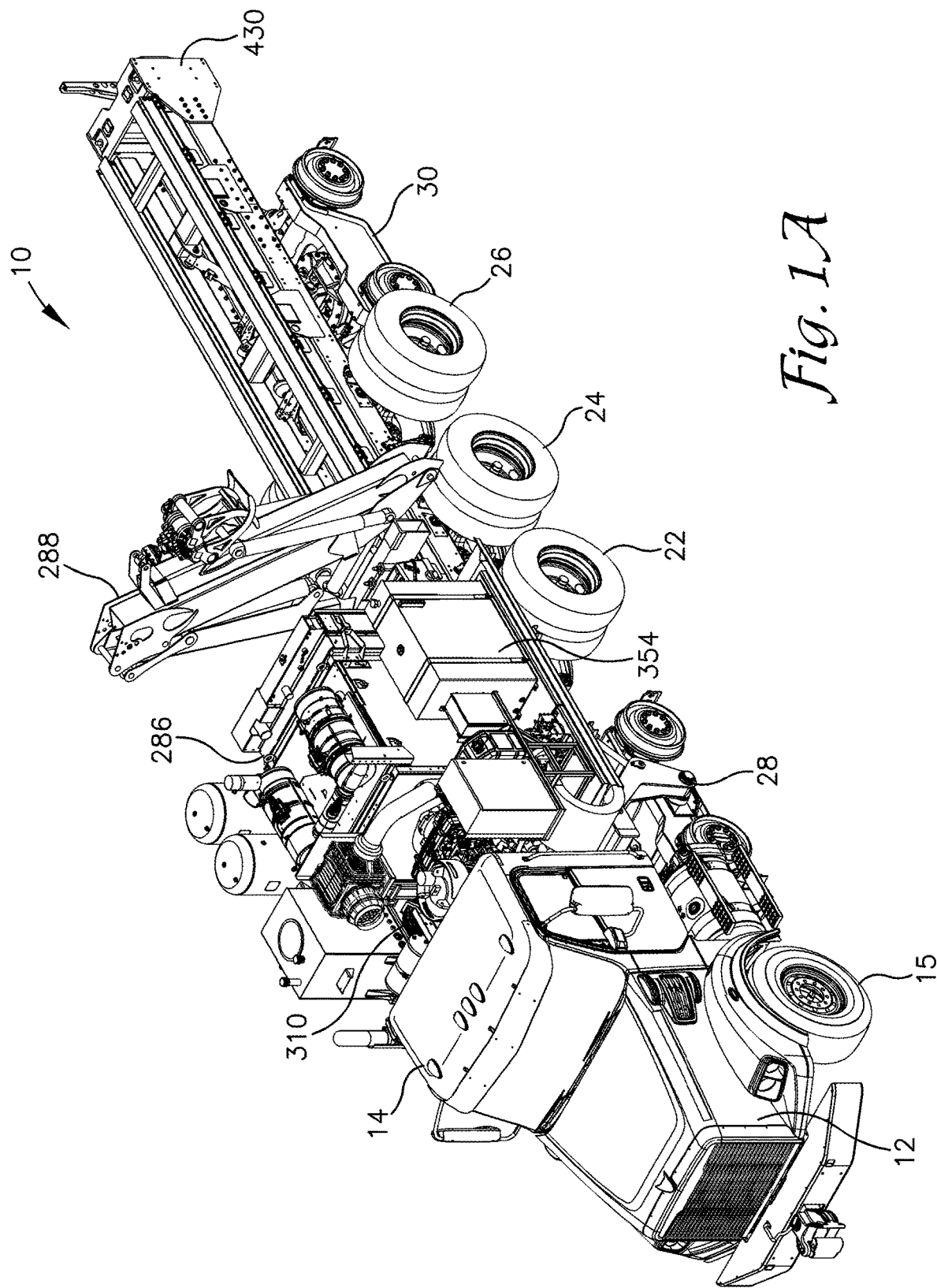
FIG. 1A is a left side perspective view of an embodiment of the railcar moving vehicle with maintenance equipment mounted thereon.
Figure 1B:
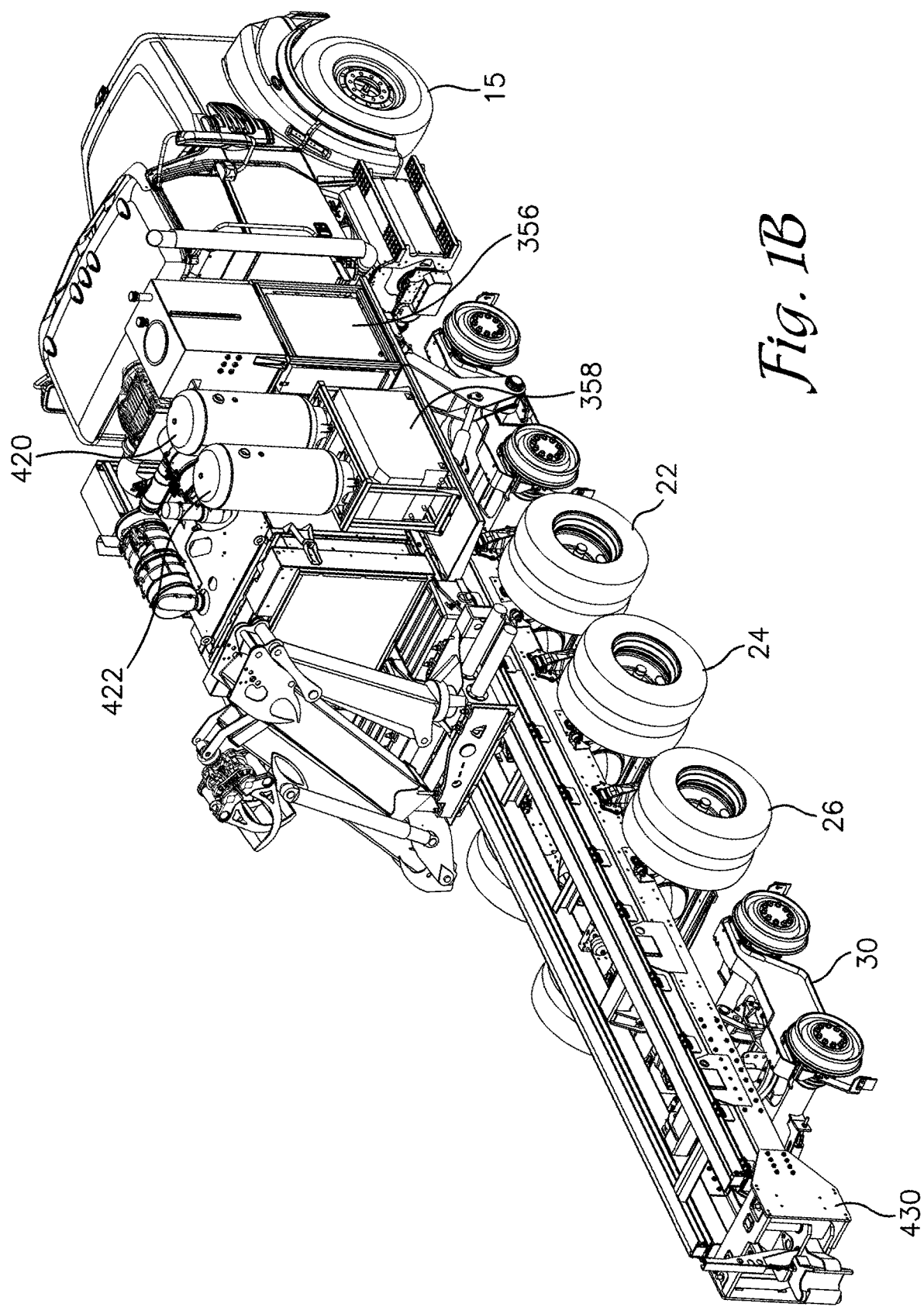
FIG. 1B is a right-side perspective view of an embodiment of the railcar moving vehicle with maintenance equipment mounted thereon.
Figure 1C:
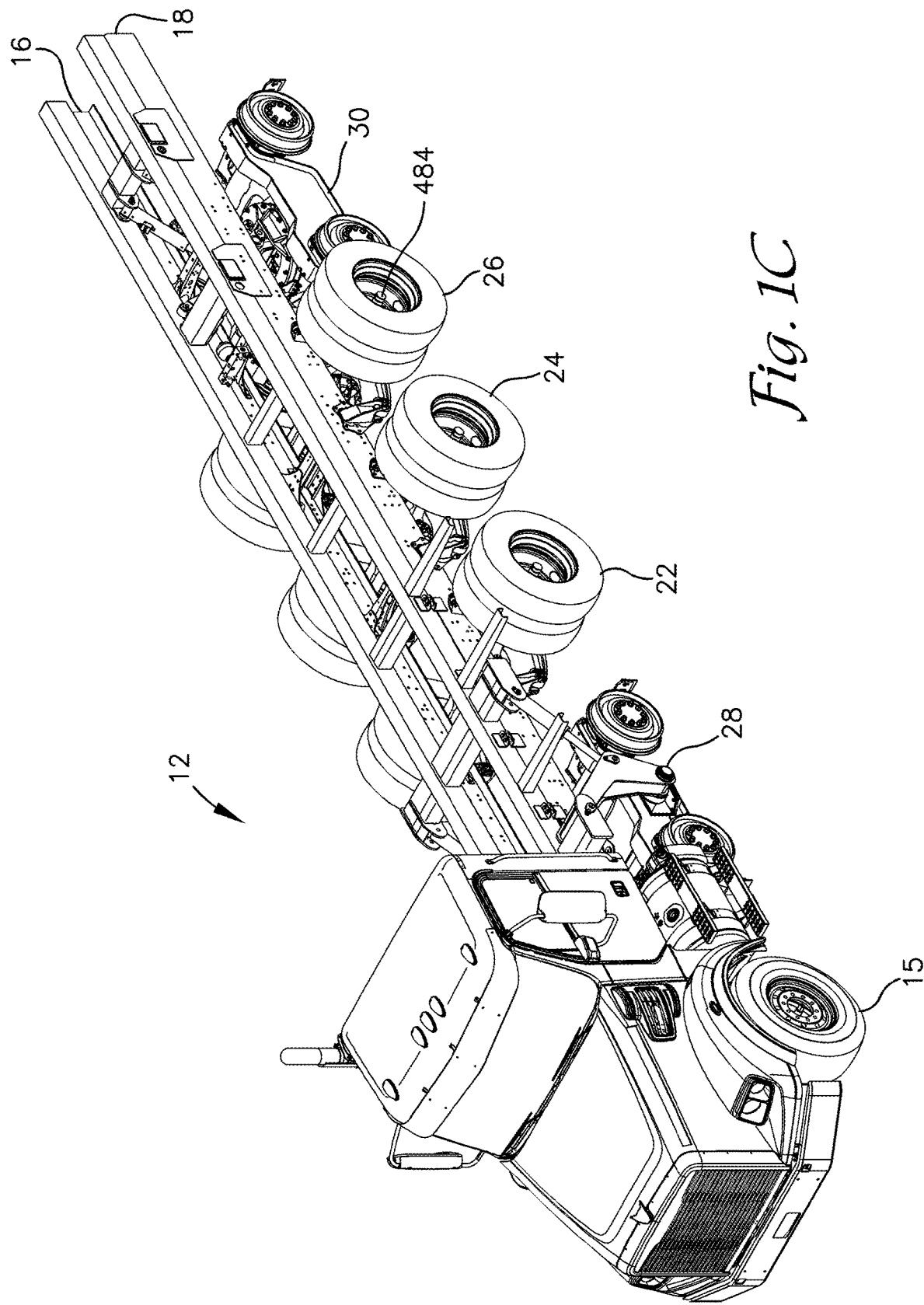
FIG. 1C is a left side perspective view of an embodiment of the railcar moving vehicle with no maintenance equipment mounted thereon.

FIG. 1A is a perspective view of a left facing embodiment of the railcar mover vehicle 10 disclosed herein with work tools mounted to the vehicle. FIG. 1B is a perspective view of a right facing embodiment of the same railcar mover vehicle 10 disclosed herein with work tools mounted thereon. FIGS. 1C, 1D and 1E reveal various views of an embodiment of a straight truck 12 employing a day cab 14 utilizing frame rails 16, 18 which are extended beyond the rearmost axle 484. The capacity of the frame rails 16, 18 to withstand fatigue, static bending, deflection, corrosion, brittle fracture and buckling failure is critically important and the frame rails must be sized appropriately for the load to be applied. Frame rails 16, 18 may be single channel or double channel depending upon the weight of system components. The vehicle 10 preferably includes a set of steering tires 15, a trio of rear axles 480, 482, 484, associated sets of drive tires 22, 24, 26 in order to widely distribute the weight of operational equipment such as an auxiliary power unit or a crane mounted to the sled system as well as the weight of the two bogies 28, 30.

Bogie Support System—Rear

Figure 2A:
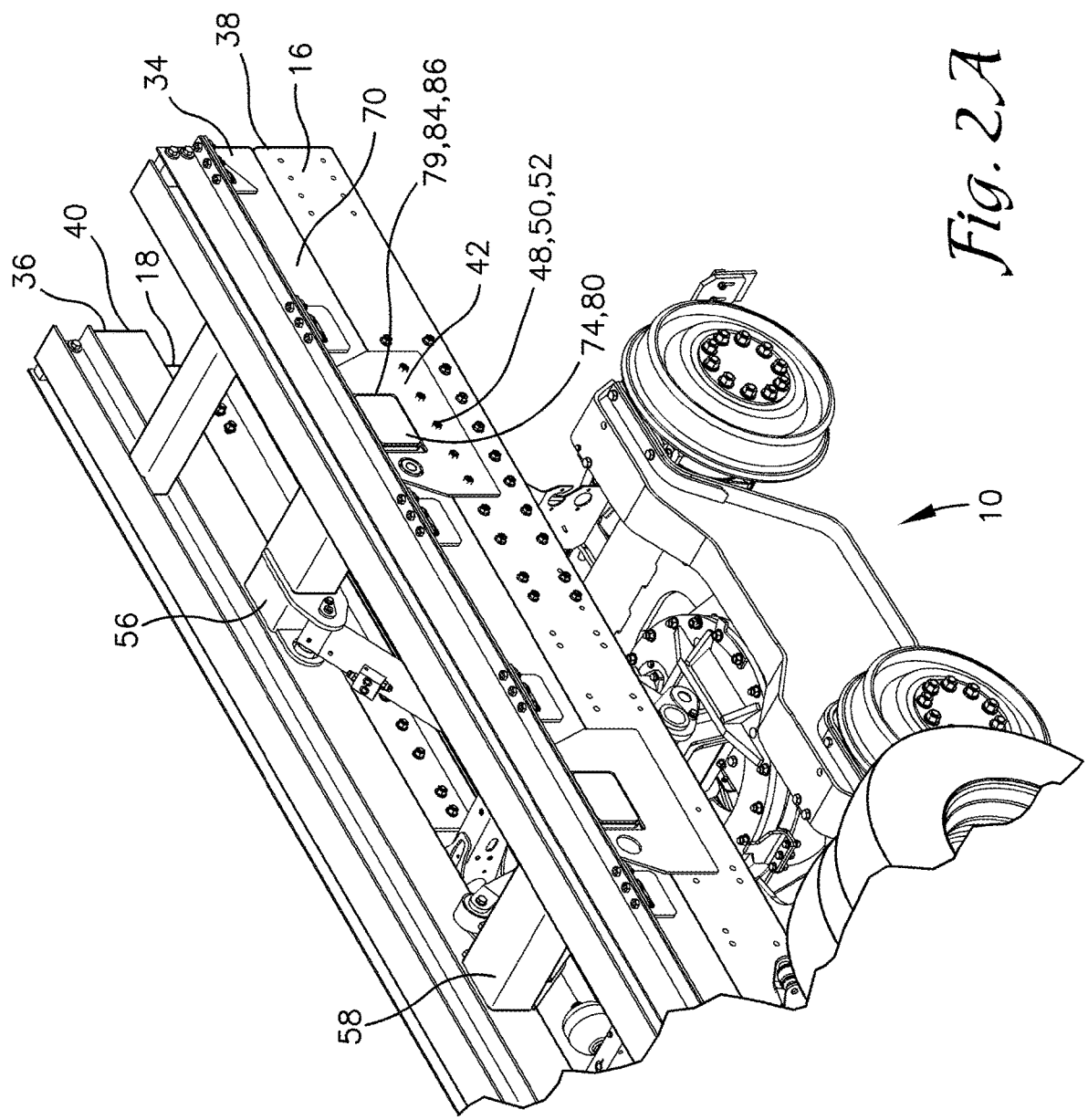
FIG. 2A is a left side perspective view of an embodiment of the rear bogie mounted to the railcar moving vehicle.
Figure 2B:
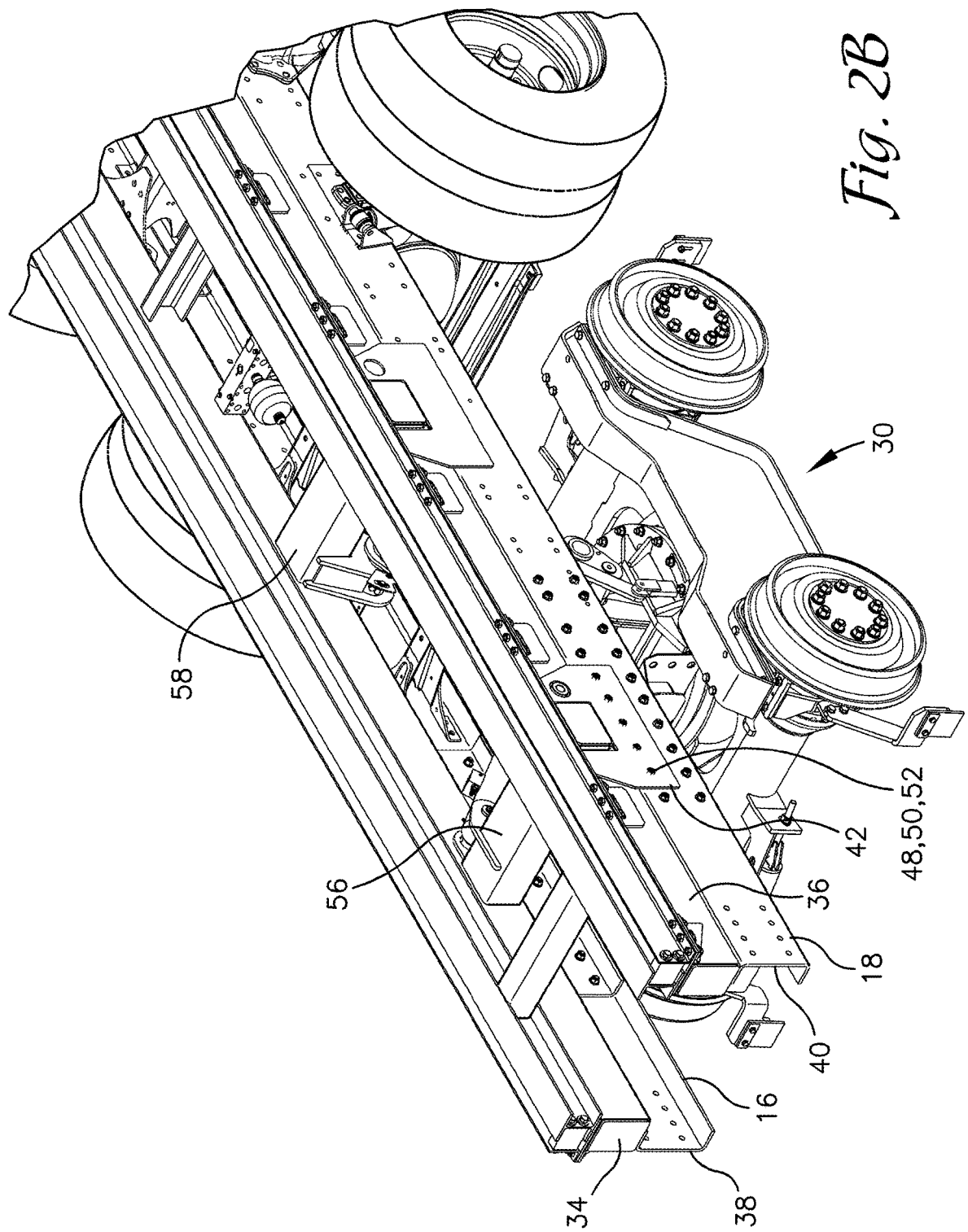
FIG. 2B is a left side perspective view of an embodiment of the rear bogie mounted to the railcar moving vehicle.

As seen in FIGS. 2A and 2B, positioned atop each of the frame rails 16, 18 are rectangular steel tube box beams 34, 36 that directly serve as the support elements for both the forward and rear bogies 28, 30. The forward and rear bogies are each suspended from two separate sets of box beam cross members 56, 58 that are in turn welded to and supported by the two steel tube box beams 34, 36. The "support system" as described herein is comprised of the frame rails 16, 18, the box beams 34, 36 and associated cross members that will be further detailed herein as well as the weldment tracks that will also be further detailed below. Components mounted to one or more of these structural features are to be construed as mounted to the support system.

The steel tube box beams 34, 36 span roughly the entire length of the truck's frame rails 16, 18. The box beams may not extend fully forward to the truck cab 14 leaving only a short gap immediately behind the cab 14 and terminating at the distal (rearmost) ends 38, 40 of the frame rails 16, 18. The box beams 34, 36 are secured to the frame rails 16, 18 through the use of overlay plates 42 that are bolted to the frame rails 16, 18. The overlay plates 42 are also welded to the box beams 34, 36. In a preferred embodiment, the overlay plates span roughly 16 to 20 inches longitudinally along the frame rails 16, 18. The overlay plates 42 also preferably extend downwardly and cover about one-half of the height of the frame rails 16, 18.

High strength steel threaded fasteners 48 are passed through pre-drilled holes 50 in the overlay plate 42 and then through holes 52 in the frame rails 16, 18. A nut (not shown) is threaded onto the fastener 48 securing the overlay plates 42 to the frame rails 16, 18. The overlay plates 42 are bolted to the frame rails 16, 18 at multiple locations to ensure a robust connection. The overlay plates 42 are bolted to the frame rails 16, 18 in order to avoid warping or weakening of the frame rails that may be caused by the welding process.

The overlay plates 42 also extend upwardly along the sides of the box beams 34, 36 and are welded in position to the box beams thereby rigidly securing the overlay plates 42 to the box beams. The overlay plates 42 are in turn rigidly secured to the frame rails 16, 18 with threaded attachment members as detailed above. As previously mentioned, the purpose of the box beams 34, 36 is to support the front and rear bogies 28, 30. The bogies 28, 30 are heavy, force generating components that must be robustly secured to the railcar moving vehicle.

Figure 3:
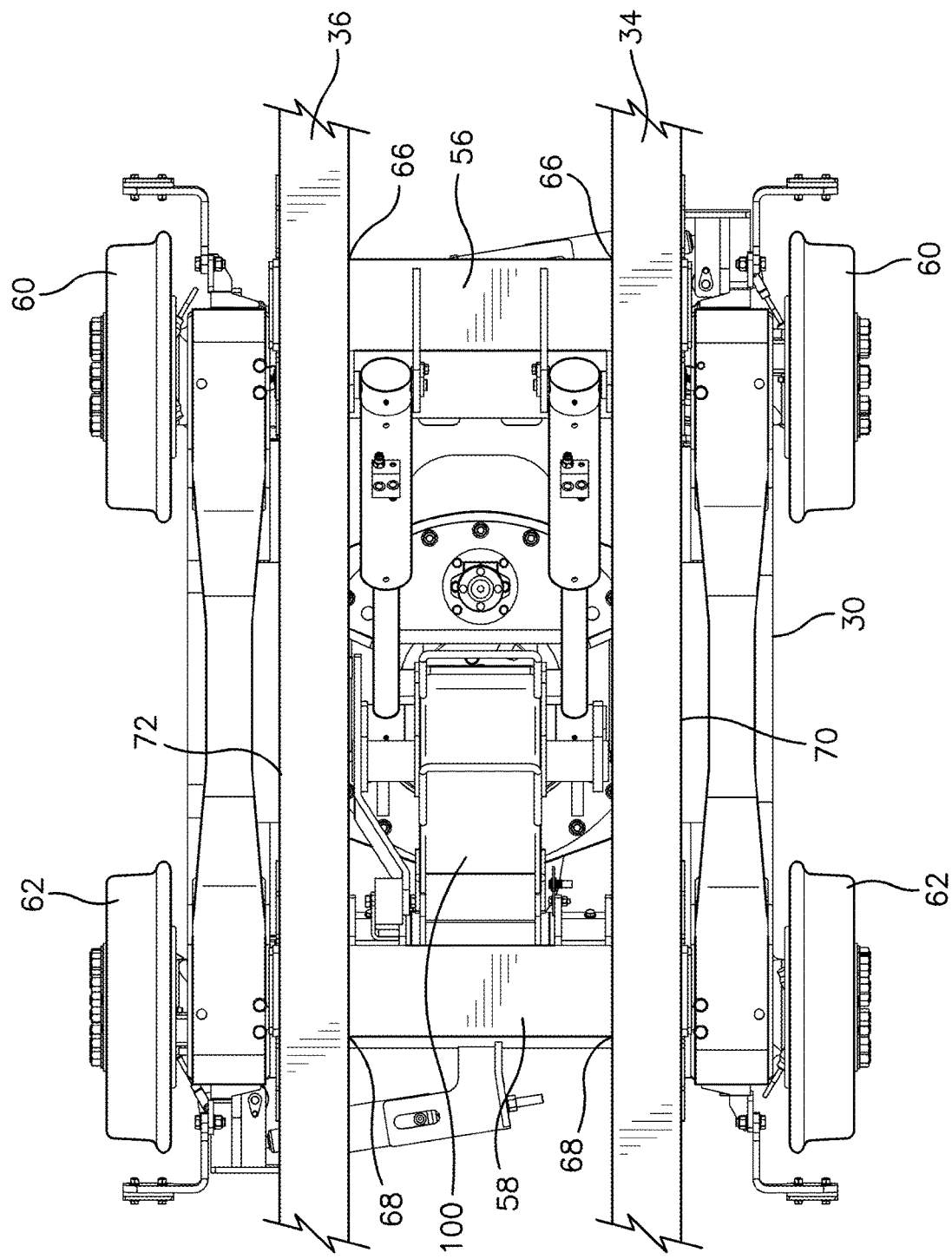
FIG. 3 is a plan view of an embodiment of the rear bogie mounted to the railcar moving vehicle.

FIG. 3 reveals two box beam cross members 56, 58 that span between the box beams 34, 36. The rear box beam member 56 is positioned roughly over the rear wheel set 60 of the bogie 30 and the forward box beam member 58 is positioned roughly over the forward wheels 62 of the bogie 30. Cutouts 66, 68 in the box beams 34, 36 are required for insertion and placement of the box beam cross members 56, 58. Both box beam cross members 56, 58 span between the outer wall 70 of the first box beam 34 and the outer wall 72 of the second box beam 36.

Returning to FIG. 2A, cutouts 74 are shown in the overlay plates 42. The end edges 76 of the box beam cross members 56, 58 extend through the box beams 34, 36 and are roughly flush with the outer walls 70, 72 of the box beams 34, 36. Once the end edges 76 of the box beam cross members 56, 58 are in position in the cutouts of the box beams 34, 36 end caps 80 are welded to the end edges 76 of the box beam cross members 56, 58 and to the opening in the box beams 34, 36. The weld seams 84 securing the end caps 80 to the end edge 76 of the box beam cross members 56, 58 also weld at least three of the edges 86 of the end caps 80 to a cutout formed in the overlay plate 42. These same weld seams 84 along the three edges of the end caps not only secure the end cap 80 to the edges 88 of the cutout 74 of the overlay plates 42 but also help to secure the overlay plates 42 to the box beams 34, 36.

Figure 4:
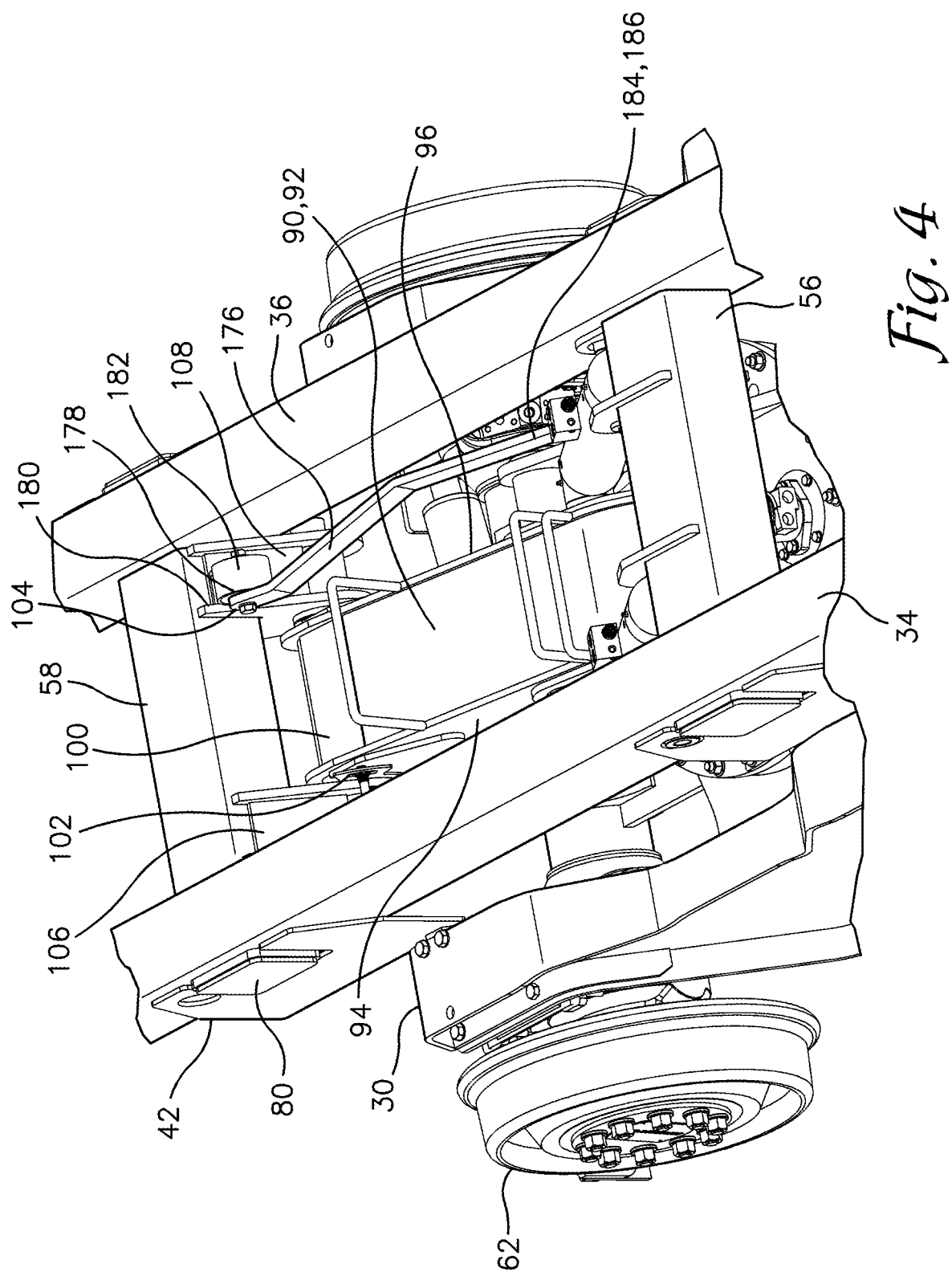
FIG. 4 is a perspective view of an embodiment of the rear bogie mounted to the railcar moving vehicle.

Exemplary hydro-static drive bogies 28, 30 are manufactured by Neotec™ Hi-Rail. The disclosed vehicle 10 may; however, utilize electric drive bogies instead of hydrostatically driven bogies. As shown at FIG. 4, an inboard-mounted lift arm 90 is employed at the rear bogie 30 that participates in achieving the desired elevation of the bogie 30. In a preferred embodiment, the lift arm 90 is a rigid steel structure with an upper wall 92, two side walls 94, 96 and a lower wall (not shown). The edges of each of the steel walls are welded to the adjacent wall to form a rigid structure.

As seen in FIG. 4, a preferred embodiment of the lift arm 90 is rotatably secured in position at the upper portion 100 of the lift arm by pins 102, 104 passing through the sidewalls 94, 96 of the lift arm and into upper mounts 106, 108 located adjacent the side walls 94, 96 of the lift arm 90. The upper mounts 106, 108 are welded to the forward box beam cross member 58 to provide structural stiffness. The rear bogie 30 lift arm 90 relies upon actuators secured to the lift arm 90 to raise and lower the rear bogie 30. In operation, the lift arm 90 rotates about the pins 102, 104.

Figure 5:
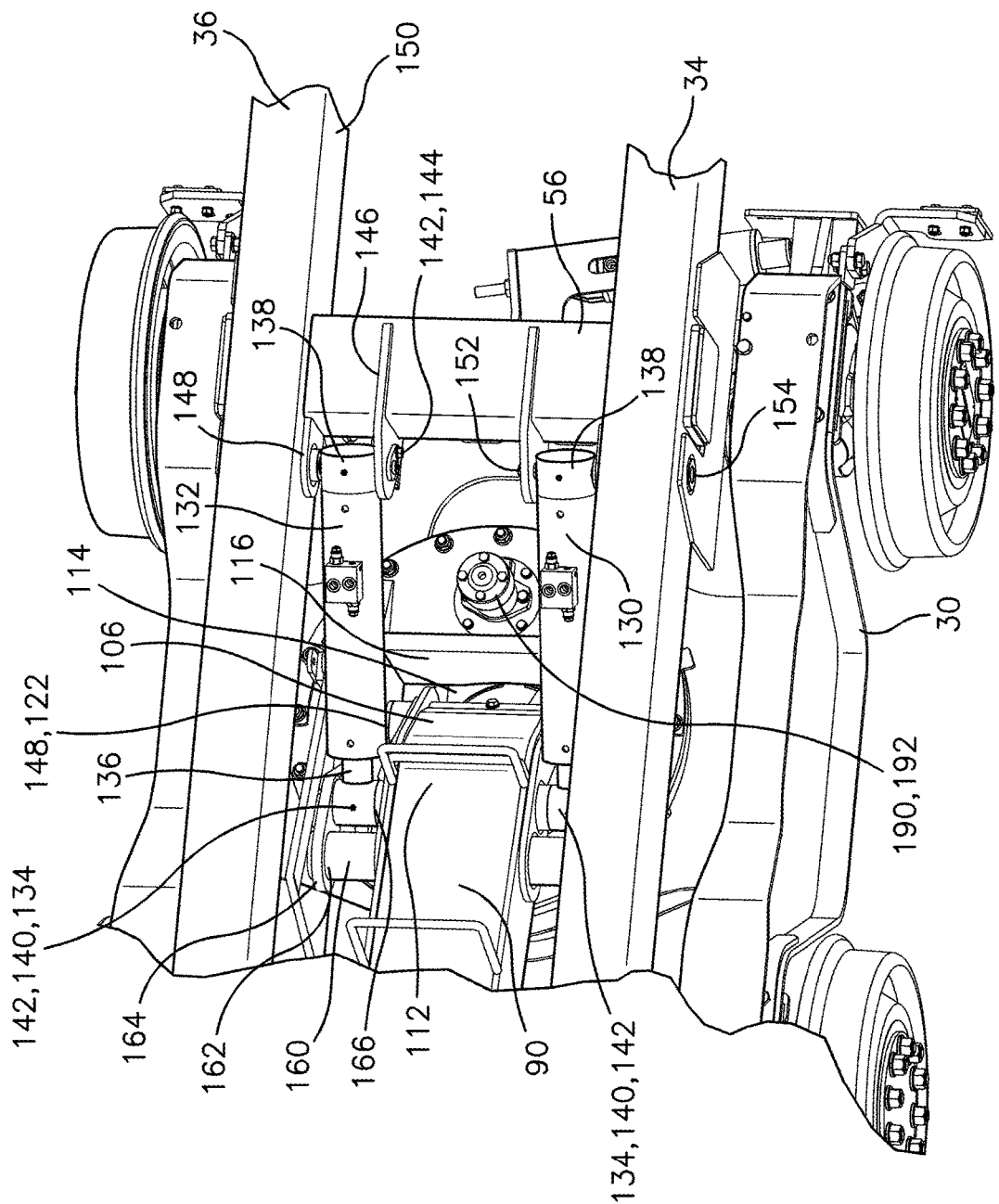
FIG. 5 is a perspective view of an embodiment of the rear bogie mounted to the railcar moving vehicle.

FIG. 5 reveals that the lower portion 112 of the lift arm 90 opposite the upper mounts is connected to the rear bogie 30 inside of a well 114 on top 116 of the rear bogie 30. Two rotational cylindrical joints 118 adjacent both side walls 94, 96 of the lift arm 90 along with pins 122 secure the lower lift arm 90 to the rear bogie 30. FIG. 5 further reveals a pair of hydraulically powered actuators 130, 132 that each further include a pivotal rod mount 134 at the end of the actuator shaft 136 and base mounts 138 used to rotatably secure the actuators 130, 132 into position. The base mounts 138 are secured in position by a pin 142 passing through not only the base mount openings 144 but also through bracket plates 146, 148 located on each side of the base mounts 138. The inboard bracket plates 146 extend outwardly from and are welded to the box beam cross member 56. The outboard bracket plates 148 are welded to the inboard walls 150 of the box beams 34, 36. The pins 142 associated with each powered actuator 130, 132 extend through the inboard bracket plate 146, the rod mount 134, through the inboard bracket 146 and all the way through each box beam 34, 36. The inboard side of the pin 152 is secured in position by a threaded fastener 156 mounted to the inboard bracket plate 146.

The rod mounts 134 include an opening 140 through which an anchoring pin 142 passes and retains the rod mount 134 in position. The rod mounts 134 of both of the hydraulic actuators 130, 132 are pivotally secured to each side of the lift arm 90. Extending outwardly from each side 94, 96 of the lift arm 90 and welded to the lift arm is a boss 160. The boss is preferably a solid steel rod of sufficient circumference to withstand the significant loads transferred to and from the lift arm during operation. Welded to the outward end 162 of the boss 160 is a rod mount bracket member 164. The boss 160 serves to extend the rod mount bracket member 164 a distance sufficiently far from the lift arm 90 to accommodate receiving the rod mount 134 into the space between the rod mount bracket member 164 and the contact pad boss 166 that is welded to both side walls 94, 96 of the lift arm 90. Once the rod mount 134 is positioned between the contact pad boss 166 and the rod mount bracket member 164 a pin (not shown) is inserted through a predrilled hole in the rod mount bracket member 164, through the rod mount opening 140 and into the contact pad boss 166. The pin rotatably secures the rod mount 134 in position.

A torsion bar 176, as best shown in FIG. 4, is optionally employed to enhance the torsional resistance of the lift arm 90 when the wheelset of the rear bogie 30 is engaged with the rails. The torsion bar 176 is pivotally secured at the upper end 178 adjacent the starboard box beam by a bracket 180 containing a rubber bushing 182. The lower end 184 of the torsion bar 176 is restrained in position on the rear bogie 30 by a bracket 186.

The rear bogie 30 is not only capable of being raised and lowered by the hydraulic actuators discussed immediately above, the Neotec™ Hi-Rail rear bogie is also capable of 90 degrees of clockwise rotation, and return to its starting point. FIG. 5 reveals the drive motor casing 190 that sets atop the rear bogie 30. The encased electric drive motor 192 turns a main gear (not shown) situated atop the bogie thereby allowing the bogie to rotate side to side. Alternatively, a hydraulically driven motor may be used to rotate the rear bogie 30. This rotational capability is convenient for moving the railcar mover vehicle 10 from road to rail usage. The drive motor 192 is controlled by the operator of the railcar mover vehicle and additional operational details will be further discussed below.

Bogie Support System—Forward

Figure 6A:
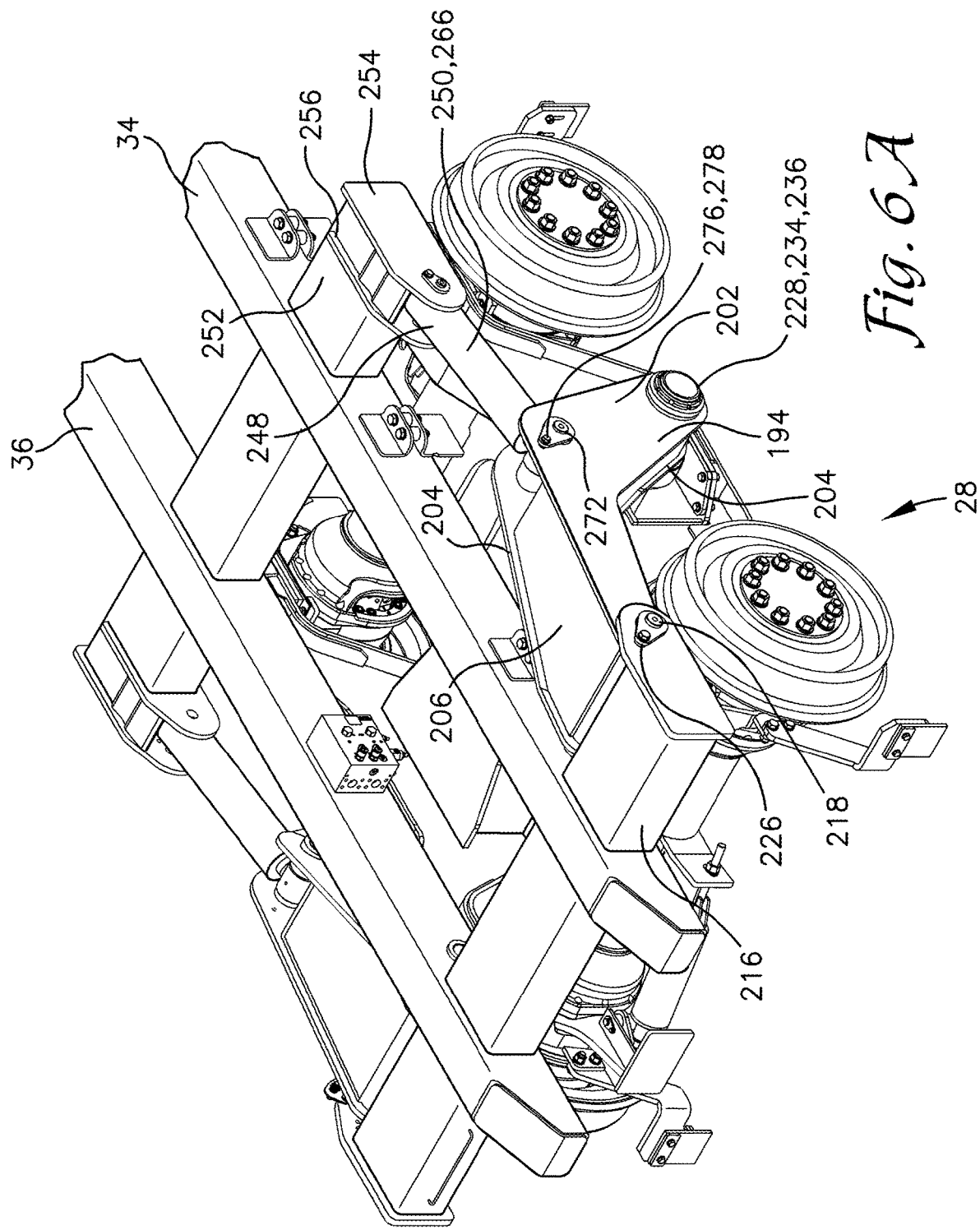
FIG. 6A is a left side perspective view of an embodiment of the front bogie mounted to the railcar moving vehicle.
Figure 6C:
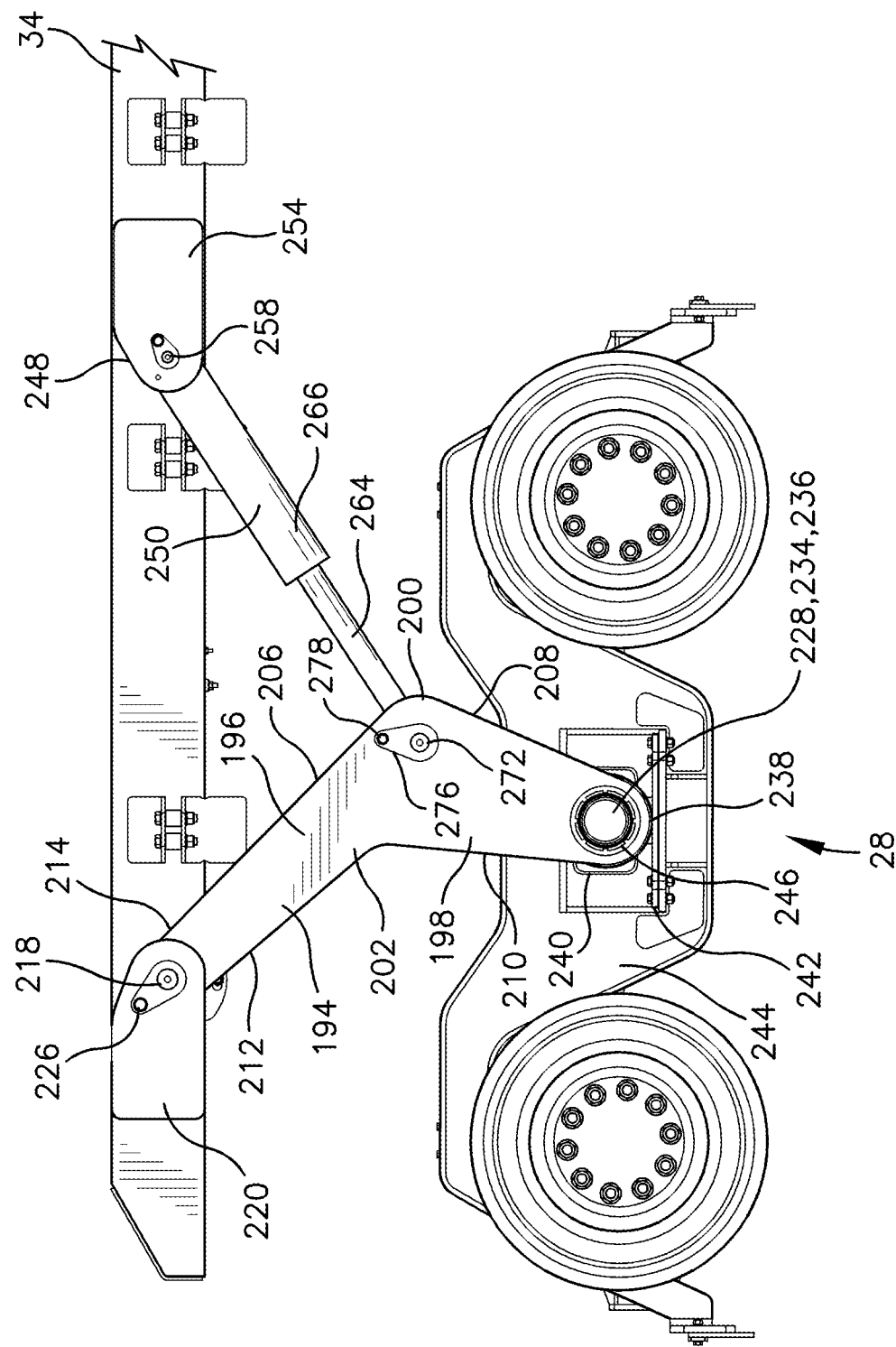
FIG. 6C is a left side elevation view of an embodiment of the forward bogie mounted to the railcar moving vehicle.

The railcar mover vehicle 10 utilizes a different configuration of components for raising and lowering the forward bogie 28 as compared to the rear bogie 30. As seen in FIGS. 6A, 6B and 6C a bogie 28 is located beneath the frame rails 16, 18. Connecting the bogie to the railcar mover vehicle 10 on each side of the vehicle is a lift member 194. The lift member 194 is boomerang shaped with a longer arm 196 and a shorter arm 198 transitioning from longer to shorter arm at an inflection point 200, wherein the two arms are canted with respect to one another at an angle in the range of about 110 to 130 degrees. The lift member 194 includes a front panel 202 and a rear panel 204 and a series of panels 206, 208, 210, 212 separating the front and rear panels from one another to allow the appropriate spacing for the connection points that are described below.

As seen in FIG. 6B, the rear panel 204 proximate the longer arm 196 diverges away from the front panel 202 as the arm extends outwardly from the inflection point 200 creating a configuration that is somewhat triangular in appearance when viewed from above. The distal end 214 of the longer arm 196 furthest from the inflection point 200 is rotatably connected to a mount 216 extending outwardly from and welded to one of the box beams 34, 36. For purposes of pivotally connecting the distal end 214 of the longer arm 196 to the vehicle frame, a pin 218 extends through the outer plate 220 of the mount 216 through the front panel 202 of the lift member 194, through the space created by the diverging panel separating the front and rear panels, through the rear panel 204 of the lift arm 194, then finally through the inner plate 224 of the mount 216. The pin 218 and mount configuration allow the longer arm 196 to rotate about the mount 216. Locking brackets 226 are secured by a threaded fastener to both the outer and inner plates 220, 224 of the mounts 216 to restrain the pin 218 in position.

The shorter arm 198 of the lift member 194 extends downwardly to a cylindrical, and rotatable, joint 228 that is positioned midway between the two wheel sets 230, 232 and at approximately the same level as the center of the wheels on the wheel sets. Unlike with the preferred embodiment of the longer arm 196, the shorter arm 198 does not include a diverging rear panel 204. The distance separating the front panel from the rear panel of the shorter arm 198 remains the same the entire span between the inflection point 200 and the cylindrical joint 228.

As best shown in FIG. 6C the cylindrical joint 228 comprises a thick walled tube 234 which passes through an opening 236 in the front panel 202 of the distal end 238 of the shorter arm 198, through a circular mount 240 secured to a set plate 242 which in turn is secured to the carriage frame 244 of the bogie 28. The thick walled tube 234 then passes through an opening 246 in the rear panel 204 of the shorter arm 198. The thick wall tube 234 is restrained in position by threaded caps 246 that lock the thick walled tube 234 into position by applying pressure to both the front and rear panels 202, 204.

As seen in FIGS. 6A, 6B and 6C, the base mount 248 of the hydraulic actuator 250 is rotatably connected to a mount 252 that extends outwardly from and is welded to the box beams 34, 36 on each side of the vehicle 10. The outer and inner mount brackets 254, 256 are parallel to and offset from the box beams 34, 36 and are spaced apart a distance sufficient to receive the base mount 248 of the hydraulic actuator 250. The hydraulic actuator base mount 248 is held in position between the inner and outer mount brackets 254, 256 by a pin 258 that extends past the outer mount bracket 254 through the opening in the base mount 248 of the hydraulic actuator 250 and then through the inner bracket 256 of the mount 252. This configuration with a pin passing through the base mount 248 of the hydraulic actuator and held in position by the mount brackets 254, 256 facilitates rotation of the base mount 248 as necessary when the hydraulic actuator 250 is in operation.

As hydraulic fluid is pumped into the rod port of the hydraulic actuator 250, the actuator retracts the shaft 264 into the barrel 266 of the actuator causing a force to be applied to the pin 258 passing through the rod mount 268 at the inflection point 200 of the lift arm causing the lift arm to rise. As the lift members 194 on both sides of the vehicle are rotated upward the bogie 28 is elevated. When the on-railing process begins the bogie 28 will be positioned over the rails. The operator causes hydraulic fluid to be directed into the base port of the hydraulic actuator thereby extending the shaft 264. As the shaft 264 extends, the bogie 28 descends to the rails. Even after the wheelsets of the bogie make contact with the rails, the operator will continue to cause hydraulic fluid to enter the base port and to extend the shaft 264 of the actuator. The objective of continuing to drive the bogie downward is to raise the front axle of the truck so there is no contact between the steering tires 15 and the rails. In the event that the steering wheels 15 remain in contact with the rails when the forward bogie 28 is fully deployed downward then axle restraints may be employed to limit the travel downward of the steering axle suspension components.

The operability of the lift member 194 is controlled by the hydraulic actuators 250 that are rotatably connected to the lift member and indirectly to the supporting box beams 34, 36. The hydraulic cylinder rod mount 268 is rotatably secured to a pin 272 at the inflection point 200. The pin 272 passes through the front panel 202, through the rod mount opening 274 and then through the rear panel 204. Locking brackets 276 are used to restrain the pin 272 in position on both the front and rear panels 202, 204 of the lift member 194. Each of the locking brackets 276 are secured in place to the front and rear panels 202, 204 by a threaded fastener 278.

Weldment Track

As shown in FIG. 7, positioned atop the box beams 34, 36 on each side of the railcar mover vehicle 10 are weldment tracks 280, 282. The weldment tracks span the entire length of box beams 34, 36 and support and facilitate movement of the sled frame 300 which optionally carries operational equipment such as an auxiliary power unit 286 and a crane 288. Equipment which could optionally be carried atop the sled frame includes, but is not limited to, scissor lifts, digger-derricks, cargo decks, cargo containers, man-lifts, a dump bed or any typical maintenance of way configuration. A preferred configuration for the weldment tracks is a typical I-beam. The attachment plate 290 is intermittently welded to the lower flange 292 of the I-beam weldment tracks 280, 282. The attachment plate 290 is offset to one side of the I-beam flange 292 such that the attachment plate extends several inches beyond the lower flange 292 of the I-beam toward the outboard side of the truck 12.

Box beam flange connectors 294 are welded to and extend outwardly from the upper outboard corner 296 of each of the box beams 34, 36. The flange connectors 294 are intermittently welded along the box beams and holes are drilled through the attachment plates 290 and the box beam flange connectors 294. Threaded fasteners, e.g., bolts and nuts 298, are passed through the attachment plate 290 and the flange connectors 294 in order to solidly secure the attachment plate 290 to the box beam flange connector 294.

Sled Frame

Figure 8A:
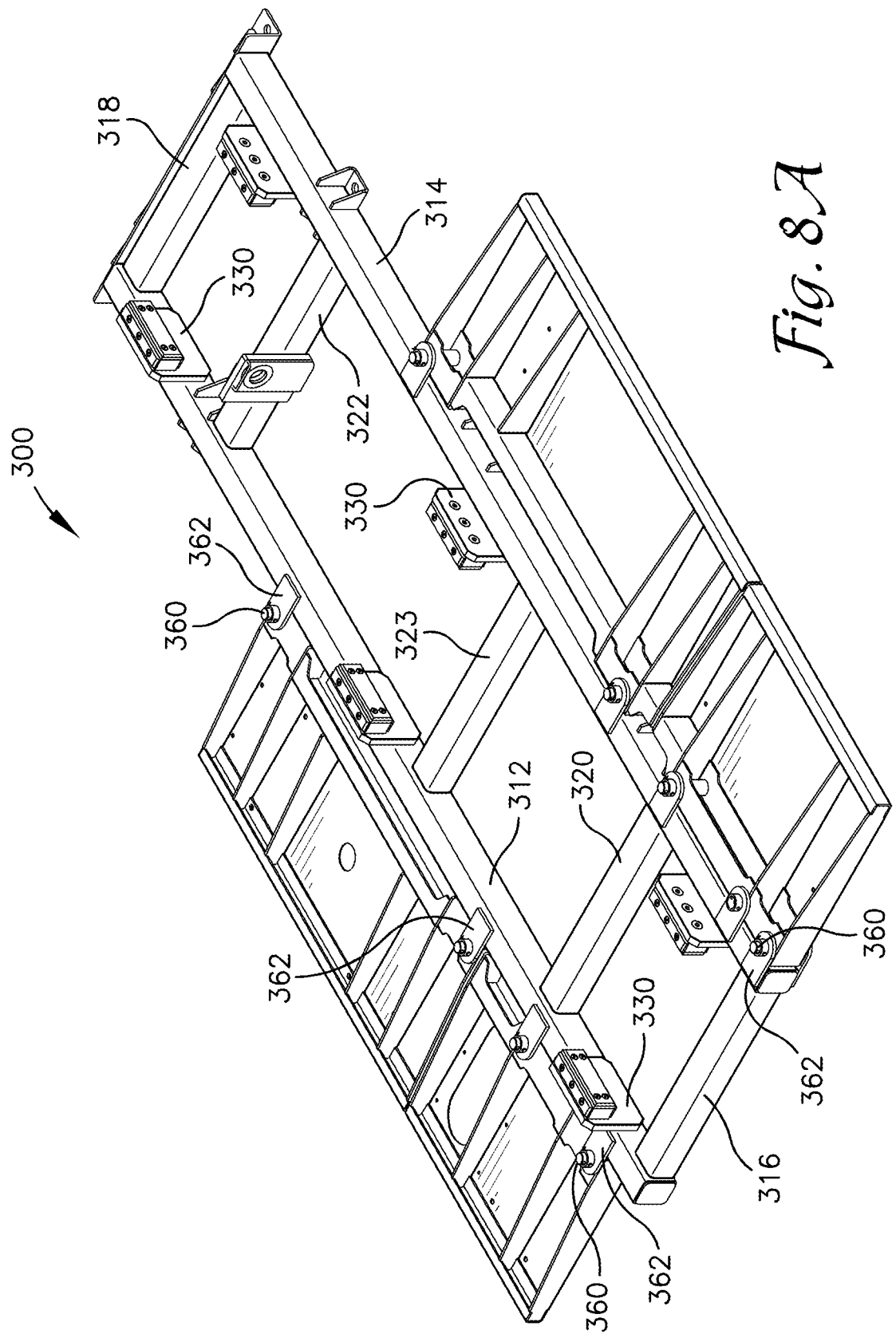
FIG. 8A is a bottom side perspective view of an embodiment of a sled frame with associated platform panels mounted thereto.
Figure 13:
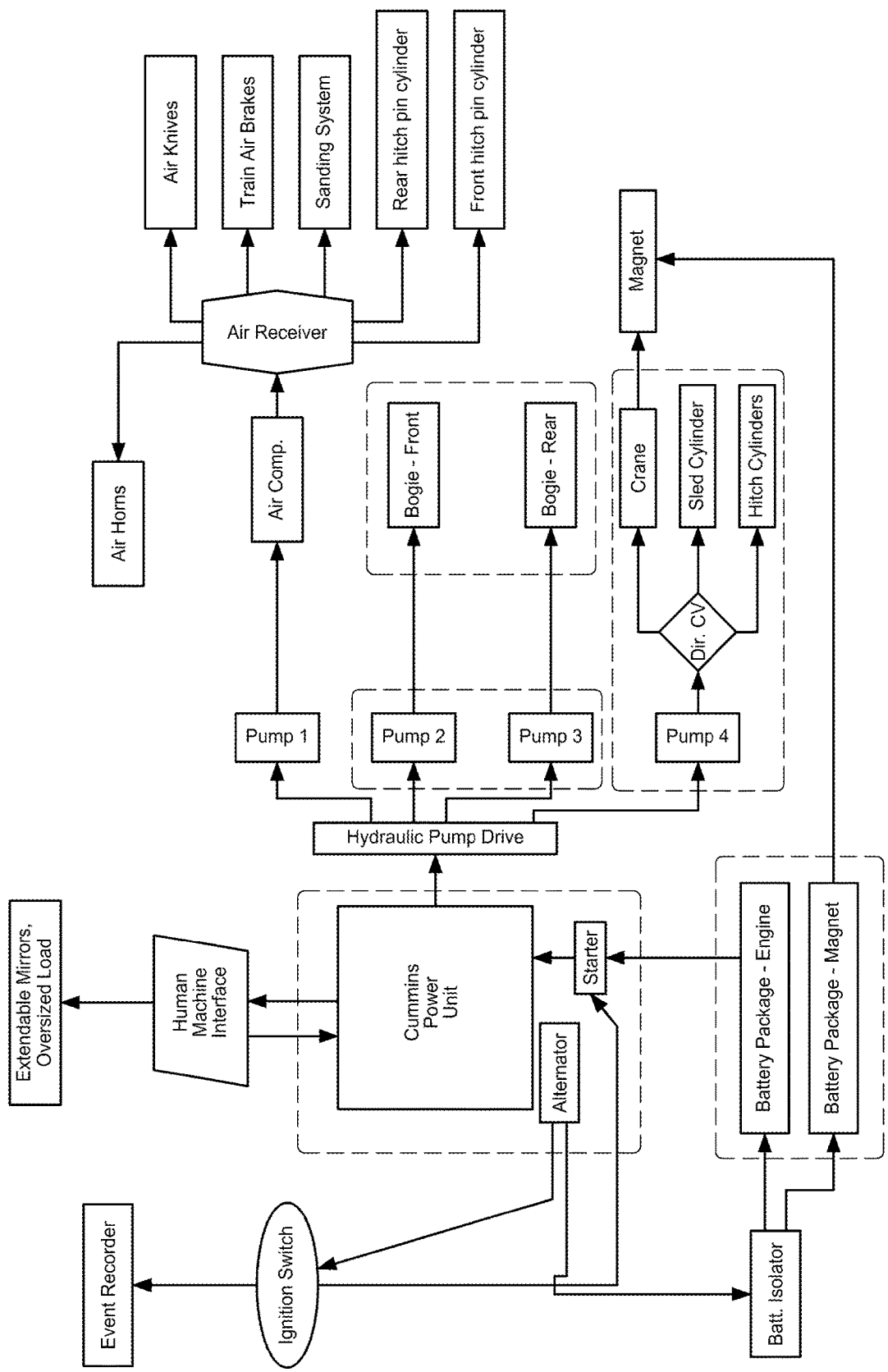
FIG. 13 is a schematic of the systems of the railcar mover vehicle.

FIG. 8A reveals the underside of the sled frame 300 that is positioned atop the weldment tracks 280, 282. The sled frame 300 is for mounting operational equipment such as an auxiliary power unit 286 and a crane 288, as seen in FIG. 1A, or other maintenance related operational components and is preferably heavily weighted. The weight applied to the sled frame can be positioned, for example, directly over a bogie to increase the tractive force supplied by that particular bogie. Optionally, the weight of the equipment mounted to the sled frame can be positioned between the bogies thereby increasing the tractive force supplied by both bogies. Importantly, the sled frame 300 and associated equipment mounted thereon are moveable by the vehicle operator between a forward position proximate the cab 14 to a rearward position proximate the rear bogie 30. The movement of the sled frame 300 is accomplished by piggy-backed actuators 306, 308, as seen in FIG. 11 in isolation and in FIG. 12 mounted beneath the sled frame 300 and powered by hydraulic fluid from a pump drive 310 driven by the auxiliary power unit 286 mounted to the sled frame. A preferred embodiment utilizes hydraulic actuators; however, an alternative embodiment may include electric drive motors and an associated drive mechanism.

The sled frame 300 is assembled with two longitudinally extending steel tubular members 312, 314. The longitudinally extending members are connected with one laterally extending cross member 316 at the front end and one laterally extending cross member 318 at the rear end. Disposed between these two members are at least two, and preferably three additional cross members 320, 322, 323 that offer additional structural rigidity to the sled frame 300. The means of fastening between the longitudinal and lateral cross members is preferably by welding; however, mechanical fasteners may also be utilized.

As shown in FIG. 7, a cross member 321 spans between and is welded to the interior surfaces of the web and flanges of the weldment tracks 280, 282 proximate the cab 14 of the vehicle 10. To this cross member 321 is secured the distal end 398 of the shaft 400 of the first of the piggybacked hydraulic actuators 306. Locking nuts 404, 406, as seen in FIG. 11, are used on each side of the cross member 321 to secure the distal end 398 in position and to provide an immovable anchor against which the sled 300 can be actuated to-and-fro along the weldment tracks 280, 282. As seen in FIG. 12, the distal end 409 of the shaft 408 of the second hydraulic actuator 308 is secured to a hydraulic shaft mount 324. The shaft mount 324 includes a mounting plate 326 and a gusset 328 for bracing the mounting plate 326 and shaft mount 324. The mounting plate 326 and gusset 328 are welded to one another and to the cross member 322 to form a reinforced assembly.

As seen in FIGS. 8A, 8B, 8C and 9 extending downwardly from both of the longitudinally extending tubular members 312, 314 are three steel sled pad plates 330 per side. As seen in FIGS. 8B and 8C, the sled pad plates 330 secure a steel retaining block 332 into position beneath the sled frame 300. The retaining block 332 in turn secures three nylon friction pads 334, 336, 338 to the upper, lower and inboard faces of each of the retaining blocks 332. The nylon friction pads 334, 336, 338 are secured to each of the retaining blocks 332 with at least three countersunk retaining bolts, the heads of each of the retaining bolts being sunk well below the outer surface of each of the nylon friction pads 334, 336, 338. The retaining blocks 332 are secured to each of the sled pad plates 330 using threaded fasteners 340. As the nylon friction pads 334, 336, 338 wear over time with usage of the sled frame, the retaining blocks can be easily removed and the nylon friction pads replaced. The sled frame 300 also includes bracket mounts 342, 344 to facilitate securing operational equipment such as the auxiliary power unit 286 and the crane 288 to the sled frame 300.

The versatility of the railcar mover vehicle 10 is maximized by the density and the functionality of the equipment that is mounted to the sled frame 300. In order to increase the footprint available for mounted equipment, as shown in FIG. 9, at least four platform panels 346, 348, 350, 352 are configured for attachment to the sled frame 300. The platform panels are used to support the fuel tank 354 (see FIG. 1A) for the auxiliary power unit 286, preferably about a 125 gallon capacity, as well as the hydraulic fluid tank and cooler package assembly 356 (see FIG. 1B) and the air compressor package assembly 358 (see FIG. 1B). Each of the platforms are held in position by pins 360 that pass through at least two sets of upper and lower pin retaining brackets 362, 364 as seen in FIGS. 8A and 9.

As shown in FIG. 10, the integration of the sled frame 300 with the weldment tracks 280, 282 requires that the sled pad plates 330 and the associated retaining block 332 and nylon friction pads 334, 336, 338 are inserted between the upper and lower flange 293, 292 on the outboard side of the web 366 of the weldment tracks 280, 282. The lowermost nylon friction pad 334 rests upon the lower outboard flange 292 while the inboard facing friction pad 336 is in close contact with, or at least close proximity to the outboard face of the web 366 of the weldment tracks 280, 282.

The upper flange 293 of the weldment track prevents upward movement of the sled frame 300, for example, when the sled frame mounted crane 288 is lifting a heavy load that could cause rotation of the crane off of the sled unless restrained by the upper flange 293. Once the nylon friction pads 334, 336, 338 are in position adjacent the outboard side of the web 366 and flanges 292, 293 the sled 300 is capable of translation along the entire length of the weldment tracks 280, 282. The nylon friction pads are wear resistant yet minimize the friction resulting from the heavily weighted sled on the weldment track. In addition, the nylon friction pads can be replaced with minimal cost and effort.

Sled Cylinder Assembly

The function of the sled cylinder system is to aid in optimizing weight distribution of the railcar mover 10 over the bogies 28, 30, depending upon operating conditions. The railcar mover optimizes its weight distribution by repositioning the hydraulically movable sled to position the weight of the sled and the associated systems mounted thereon. As previously discussed, and as shown in FIGS. 11 and 12, the piggybacked hydraulic actuators 306, 308 are positioned beneath the sled frame 300 and are centered between the weldment tracks 280, 282. The hydraulic actuators 306, 308 provide the motive force for positioning the sled frame anywhere along the weldment tracks.

The piggybacked hydraulic actuators 306, 308 oppose one another in the direction of their shaft extensions (one extending forward and the other extending rearward) and cradles 370, 372 are used to maintain the position of and bind the hydraulic actuators 306, 308 to one another. The two cradles 370, 372 span laterally beneath each of the actuators and are welded to the barrels 374, 376 of both actuators 306, 308. The cradles 370, 372 include brackets 380, 382 extending outwardly away from the actuators 306, 308. Mounted to the brackets 380, 382 are forward and rear plates 384, 386 that sandwich a single nylon friction pad 390. A plurality of threaded fasteners 392 pass through openings in the forward and rear plates as well as openings in the nylon friction pad 390 and restrain the friction pad in position. The friction pads 390 ride inboard to the weldment tracks 280, 282 and the piggybacked hydraulic actuators 306, 308 are constrained laterally by the web 366 and upper and lower flanges 292, 293 of the weldment track I-beams.

As shown in FIG. 12, and as discussed above, the distal end 398 of the shaft 400 of the first actuator 306 is secured to a cross member 321 spanning between the weldment tracks 280, 282. Locking nuts 404, 406 on each side of the cross member 321 are used to restrain the distal end 398 of the shaft 400. The distal end 409 of the shaft 408 of the second actuator 308 is connected to the cylinder mount 324 of the sled frame 300 and is secured in position with a locking nut (not shown). As the shaft 400 of the first hydraulic actuator 306 is extended by the truck operator, the piggybacked actuators 306, 308, which are secured together by the two cradles 370, 372, move rearward in unison. As the two piggybacked actuators move rearward the cradles 370, 372 brackets 380, 382 and nylon friction pads 390 all retreat rearward within the confines of the inboard area of the I-beam weldment tracks 280, 282. The shaft 400 of the first actuator 306 and the shaft 408 of the second actuator 308 extend and retract simultaneously as directed by the vehicle operator based upon the need to reposition the sled frame 300 with the equipment mounted thereon.

Sled Mounted Equipment

As seen in FIGS. 1A, 1B, 1C and 13, the sled frame 300 is configured to carry a wide range of operational equipment to address railcar maintenance, repair and towing. The sled frame is configured for mounting of an auxiliary power unit (APU) 286. One such example of an APU is a Cummins® QSX15 Tier 4 Final, 500 horsepower unit; however, a wide range of diesel engines may power the maintenance related equipment mounted atop the sled frame. The APU is configured to drive a hydraulic pump drive 412 which in turn powers hydraulic pumps that deliver hydraulic fluid under pressure to the sled mounted equipment. An exemplary pump drive is a Model DT41 manufactured by Gear Products™. In a preferred embodiment of the vehicle 10, the pump drive 412 is driven by the APU 286 which in turn drives four separate pumps delivering fluid to 1) the bogies 28, 30 as well as the hydraulic actuators that raise and lower the bogies, 2) a crane 288, an exemplary model being a Hyva™ HZR120 Z1 1082 folding loader with a Hyva™ H632HPX Timber Grab with a rotator package, 3) the sled hydraulic actuators 306, 308 and 4) the air compressor 416. All of the above referenced components except the bogies 28, 30 are preferably mounted onto the sled frame 300.

Because the railcar mover 10 is capable of towing several railcars at one time the railcar mover must have the capacity to provide all of the towed railcars with compressed air to release their brakes. An exemplary compressor is a hydraulically driven Vanair® model RS85 capable of delivering 85 cfm of air at 125 psi. The railcar mover bogies 28, 30 provide braking; however, the railcar mover's air system is also used to pneumatically actuate the brakes of the railcars when necessary. An exemplary train air brake system is the Wabtec Corporation's FastBrake™ Electronic Air Brake. The compressor 416 driven by a hydraulic pump 418 is capable of delivering compressed air to the pneumatic cylinder operations for the front and rear hitch pin lifters as well as to provide a supply of compressed air for miscellaneous equipment, such as for pneumatic hand tool operation by the maintenance personnel engaged in repair of the railcars.

As seen in FIG. 1B, the sled frame 300 also supports at least two compressed air tanks 420, 422 preferably mounted atop the air compressor 416. These tanks 420, 422 are required to continuously maintain an adequate volume of air to ensure release of the brakes of the towed railcars. Also supported atop the sled frame 300 are a hydraulic fluid reservoir and cooler assembly 356. The hydraulic fluid reservoir preferably has a volume of approximately 100 gallons and supplies the pump drive 412 with the required volume of hydraulic fluid to operate the various hydraulically powered systems onboard the railcar mover vehicle 10. To maintain functionality, hydraulic fluid must be cooled to a temperature below 180° F. in order to maintain the fluid at a temperature below 180° F. a hydraulic fluid cooler assembly is mounted on the sled in proximity to the fluid reservoir.

Rear Coupler Assembly

Figure 14:
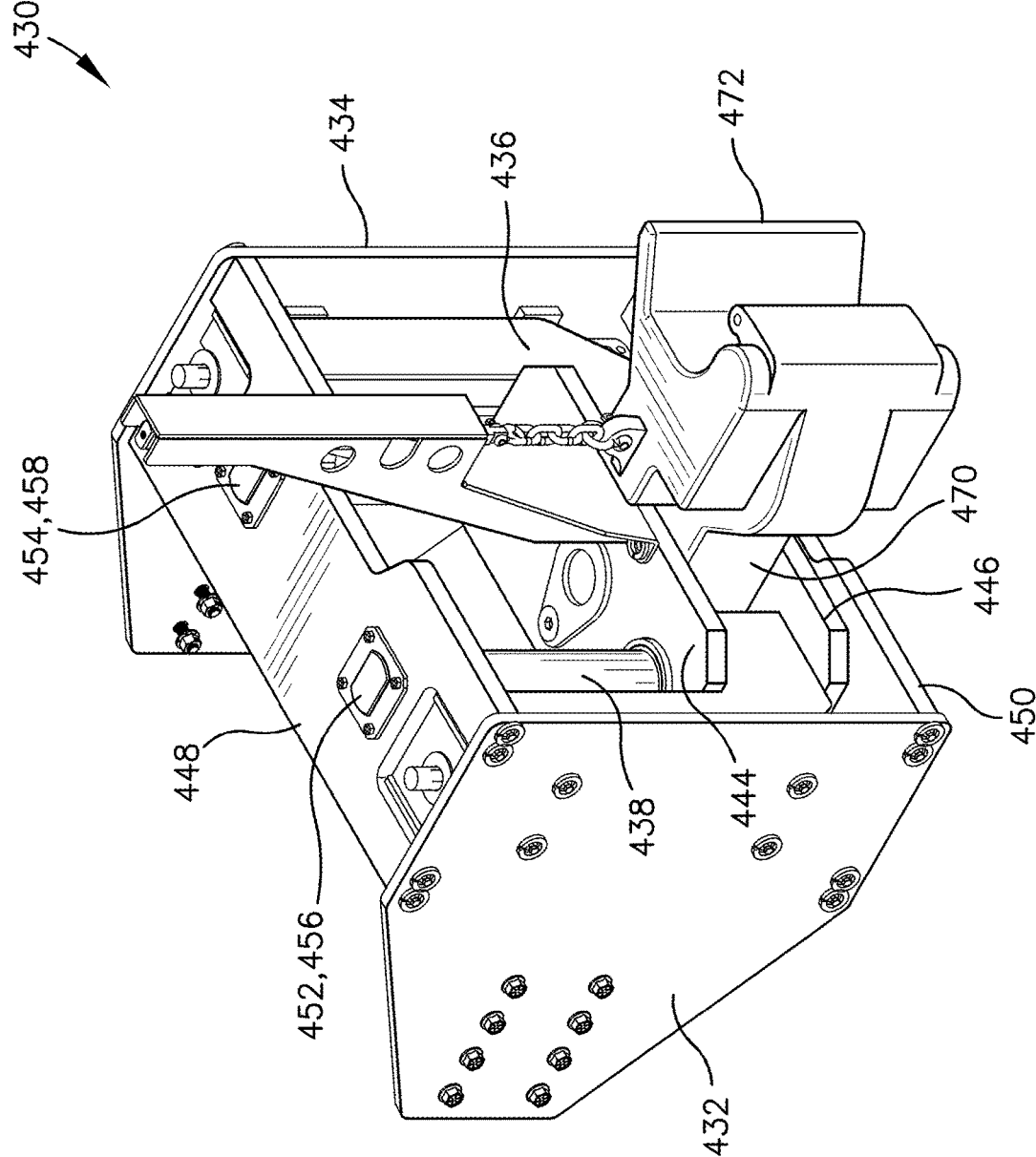
FIG. 14 is a perspective view of an embodiment of a railcar coupler with hydraulic lift capability.

As seen in FIG. 14, the railcar coupler assembly 430 located at the rear end of the truck 12 is configured to couple with a railcar and to lift the railcar coupler. The purpose of the coupler assembly 430 is not to raise the wheels of the railcar off of the rails but to transfer a portion of the load from the railcar bogies to the railcar mover 10 and specifically to the rear bogie 30 of the railcar mover 10 in order to reduce, or eliminate, slippage between wheelset of the railcar mover rear bogie 30 and the rails. Side plates 432, 434 of the coupler assembly 430 are bolted to the frame rails 16, 18 of the truck 12.

The side plates 432, 434 constrain the coupler slide assembly 436 that includes two vertically oriented rod slides 438 two horizontal coupler plates 444, 446 and upper and lower coupler assembly plates 448, 450. The upper ends 452, 454 of the rod slides 438 are secured with fasteners 456, 458 to the upper coupler assembly plate 448. The lower ends (not shown) of the rod slides 438 are secured in position with fasteners (not shown) to the lower coupler assembly plate 450. The horizontal coupler plates 444, 446 are horizontally restrained in position by the rod slides 438, 440 that pass through the coupler plates; however, the coupler plates can readily move up and down gliding along the rod slides 438. The horizontal coupler plates 444, 446 are vertically separated from one by the butt 470 of the coupler body 472 positioned between the plates. Once coupled to a railcar, the coupler body 472 can be raised by one or more hydraulic cylinders (not shown) within the coupler assembly 430 in order to transfer weight from the railcar to the rear bogie 30 of the railcar mover vehicle 10. A short-bodied locomotive coupler is modified to create a mechanism for raising the mated coupling on the attached railcar.

Axle Restraints

When the railcar mover 10 is positioned over the rails the rear bogie descends for placement of the bogie wheelset 30 onto the rails. As the rear bogie actuators 130, 132 cause the bogie to descend, the frame rails 16, 18 of the truck 12 will elevate as the hydraulic actuators extend their actuator shafts 136 causing the lower portion 112 of the lift arm 90 to rotate downward. As the frame rails 16, 18 of the truck 12 begin to rise, the tridem axles 480, 482, 484 and associated rubber drive tires 22, 24, 26 descend and remain in contact with the rails even as the frame rails 16, 18 are elevated. This is an undesirable outcome and is caused by the inherent flexibility of the truck's suspension system. A key objective of the railcar mover 10 is to maintain the rubber road wheels 22, 24, 26 off of the rails while the railcar mover 10 transits upon the rails. Continuous contact between the tires and the rail will lead to premature wear of the tires and require replacement of the tires resulting in high maintenance costs.

To address the undesirable lowering of the tridem axles 480, 482, 484 as the rear bogie 30 raises the frame rails 16, 18 during the on-railing process, axle restraints (not shown) may be, but are not required to be employed. One variant of an axle restraint utilizes a chain of about three feet in length may be utilized. One embodiment of an axle hook comprises, for example, an 8 inch J-hook that is slid between the frame rails 16, 18 and tires and is hooked to one of the axles 480, 482, 484 (see FIG. 1D for axle locations). A first grab hook is then hooked to the frame rails 16, 18 and a second grab hook that is co-forged with the first grab hook, but divergent from the first grab hook by about 70 degrees, is used to remove slack from the chain. Preferably two chains are used, one for each side of the axle to restrain the axles in place as the vehicle is lifted by the rear bogie wheelset 30. An alternative embodiment of an axle restraint is a nylon strap that is secured to the frame of the vehicle that limits downward movement of the suspension of the truck but otherwise does not interfere with the intended functionality of the vehicle's suspension.

In Operation

Figure 15:
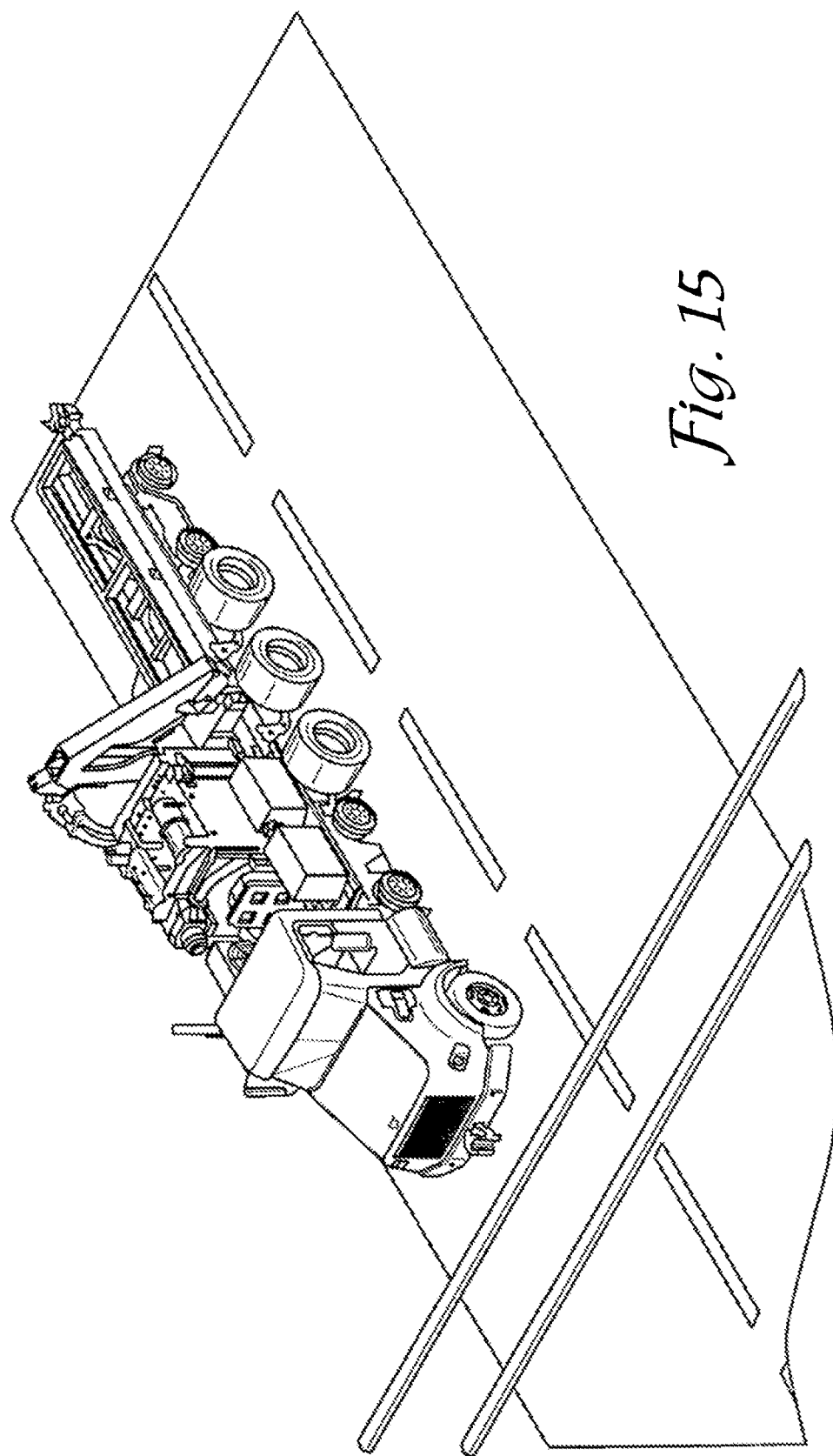
FIG. 15 is a perspective view of a first step of on-railing the railcar mover vehicle.
Figure 16:
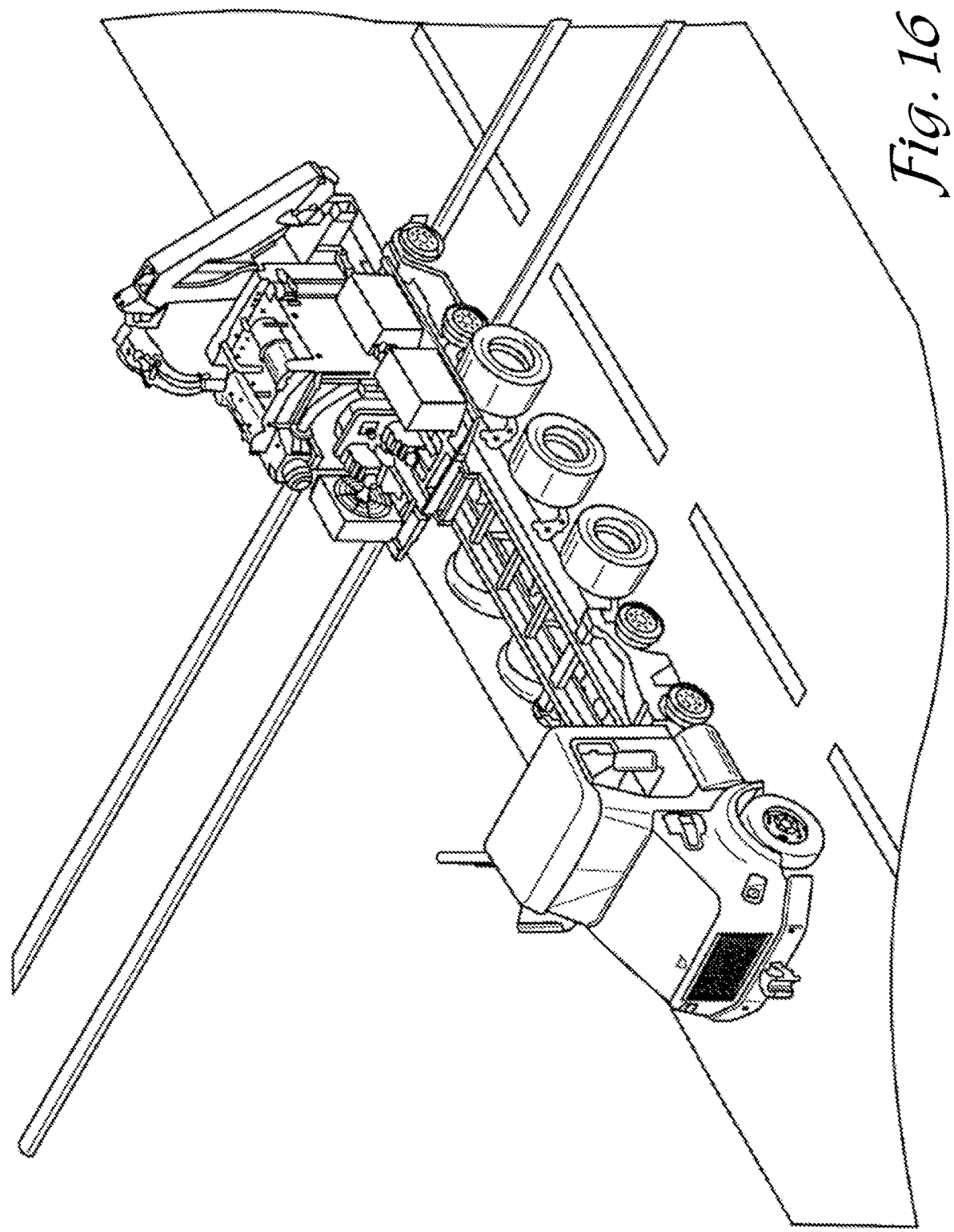
FIG. 16 is a perspective view of a second step in on-railing the railcar mover vehicle.

In normal operation, the vehicle 10 will be driven under its own power on its wheels to get to and from its point of use. Standard truck 12 operating practices are therefore required and it will be necessary to follow the truck manufacturer's recommended operating procedures. To gain access to the rails, the vehicle 10 will be driven to a point where there is a rail crossing as shown in FIG. 15. During this driving interval, the sled frame 300 and associated equipment are positioned near the cab 14 to optimize weight distribution on road wheels. As shown in FIG. 16, once a rail crossing is reached, the rear bogie 30 of the railcar mover 10 is placed directly over the rails. As seen in FIG. 16, the bogie wheelset is perpendicular to the rails. The auxiliary power unit 286, or alternatively a hydraulic pump driven by a power take off (PTO), is then started and the piggybacked hydraulic cylinders 306, 308 push the sled frame 300 rearward along the weldment tracks 280, 282 to the rear of the railcar mover 10.

The nylon friction pads 334, 336, 338 of the sled frame 300 traverse on the outboard side of both weldment tracks 280, 282 with most of the weight of the sled frame 300 and the equipment mounted to the sled frame riding on the lower friction pad 334 which is in contact with the lower flange 292 of the weldment tracks 280, 282. The upper flange 293 of both weldment tracks 280, 282 prevent upward movement of the nylon pads and the retaining blocks 332. This positioning of the sled frame 300 and associated equipment reduces the load on the steering tires 15 and allows easier steering of the vehicle.

Figure 17:
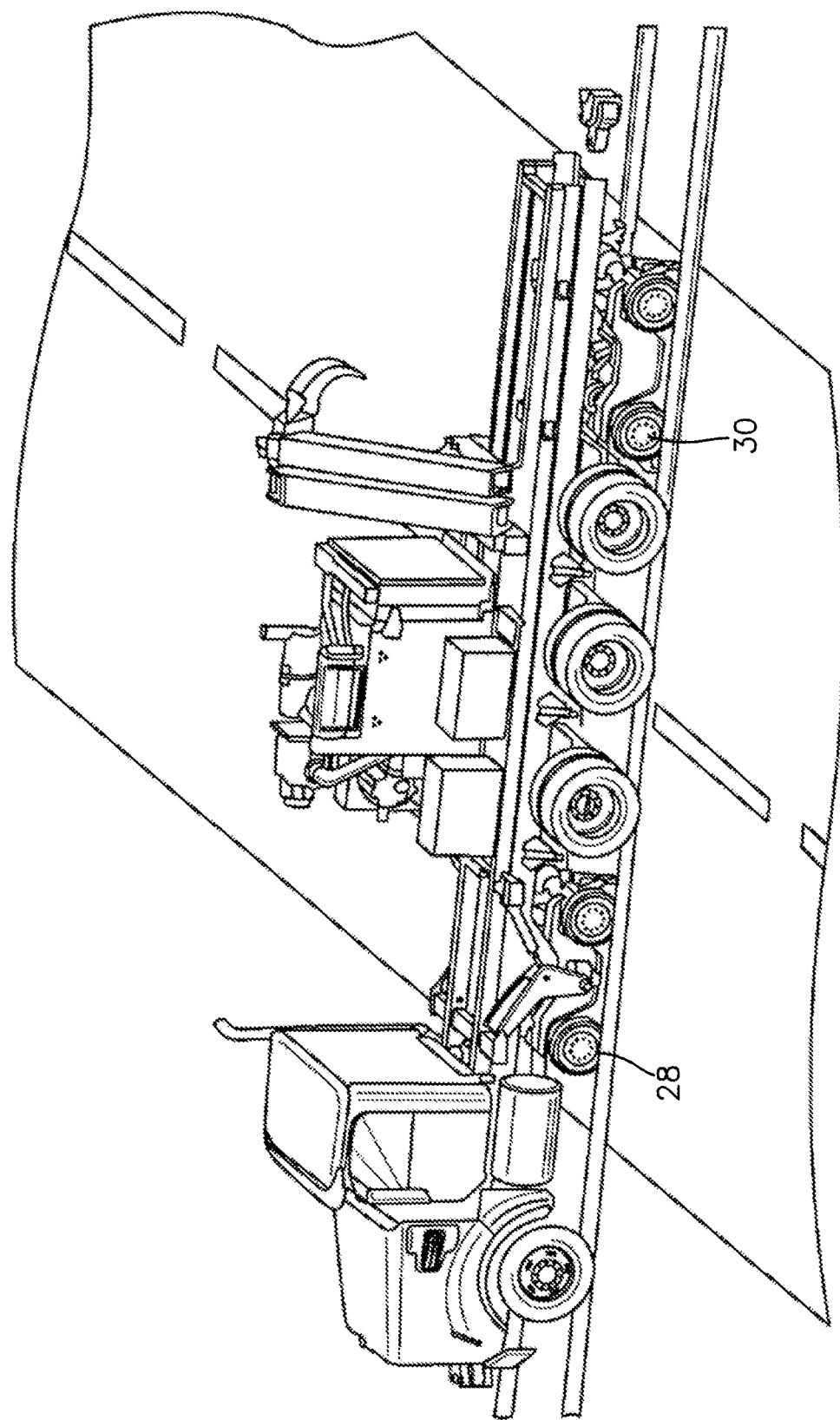
FIG. 17 is a perspective view of a third step in on-railing the railcar mover vehicle.

With the aid of controls located in the cab 14 the rear bogie 30 is lowered slightly to clear the truck frame using proximity switches (not shown) to determine travel. Utilizing closed circuit television to aid the operator, the rear bogie 30 is rotated to align the bogie with the rails. After the rear bogie 30 is aligned, it is lowered to engage the rails, while utilizing strategically placed closed circuit television cameras (not shown) to assist the operator with the alignment process. Once the rails are engaged by the bogie wheelsets, the rear bogie 30 is extended fully downward utilizing the hydraulic actuators 130, 132. The rear bogie 30 is then driven along the rails while the driver/operator sharply turns the steering wheels of the truck 12 to position the cab 14 directly over the rails. As seen in FIG. 17, this maneuver, while utilizing front mounted cameras (not shown) aligns the front bogie 28 over the rails.

Once the front bogie wheelset 28 is positioned over the rails, the operator lowers the front bogie wheelset for engagement with the rails. As with the rear bogie wheelset 30, the operator activates the hydraulic actuators 250 of the front bogie 28 on each side of the railcar mover 10 to rotate the lift member 194 downward thereby raising up the frame rails 16, 18 and the steering wheels of the truck 12 so that the steering wheels are no longer in contact with the rails. As seen with FIG. 17, the operator then repositions the sled frame 300 and associated hardware to between the front and rear bogies 28, 30. This positioning of the sled frame 300 optimizes the weight balance on the bogies and most railcar pulling operations can be done in this configuration. Following placement of the sled frame 300 in an optimal position, the truck transits along the rail to the location of the railcar or locomotive in need of towing.

When pulling more or heavier railcars the operator may activate the hydraulic actuator connected to the coupler body 472 of the rear coupler assembly 430 causing the coupler body 472 to lift up on the coupler of the first railcar/locomotive thereby increasing the load on the rear bogie 30 of the railcar mover 10. The rear coupler assembly 430 utilizes a pressure sensor (not shown) to monitor the fluid pressure in one of the hydraulic actuators 476 in the coupler assembly 430. The operator then actuates the piggybacked hydraulic actuators 306, 308 and moves the sled frame 300 forward (towards the cab) to increase the weight on the front bogie 28.

In order to move the sled frame 300 forward from the rearmost position over the second bogie 30 to the forward position over the first bogie 28, one operational scenario is that the operator actuated hydraulic system will fully retract the shaft 408 of the second hydraulic actuator 308 and then fully retract the shaft 400 of the first hydraulic actuator 306. The operator retracts the second shaft 408 which at the distal end 409 is connected to the shaft mount 324 by locking nuts 410. The force generated by the retraction of the shaft 408 pulls the sled frame 300 and the operational equipment mounted thereon partway fully forward.

Once the second shaft 408 is fully retracted into the barrel 376 of the second hydraulic actuator 308, the system activates the first hydraulic actuator 306 to commence retraction of the first shaft 400 into the barrel of the first hydraulic actuator 306. The distal end 398 of the first shaft 400 is secured to the forward most cross member 321 and applies a force to the well anchored cross member 321 when either of the shafts 400, 408 are being extended or retracted. Secured to each of the four sets of brackets 380, 382 are forward and rear plates 384, 386 that sandwich the nylon friction pads 390 in position and are secured with mounting hardware 392.

As the first shaft 400 retracts into the actuator barrel 374 of the first hydraulic actuator 306 not only do the piggybacked actuators 306, 308 move in unison but due to their interconnectedness, the brackets 380, 382, forward and rear plates 384, 386 and the nylon friction pads 390 all move forward in unison. The four nylon friction pads 390 glide along the inboard side of the weldment tracks 280, 282. The nylon friction pads 390 are restricted to only linear translation, along the inboard side of the weldment track, by the upper and lower flanges 292, 293 and the web 366 of the weldment tracks. Movement of the nylon friction pads 390 up, down or outside of the weldment track is fully restrained.

As discussed above, the distal end 409 of the shaft 408 of the second actuator 308 is secured in position by a locking nut 410 at the cylinder shaft mount 324 of the sled frame 300. As force is applied to the cylinder shaft mount 324 by the shaft 408 of the second actuator 308 the force is transferred to the cross member 322 and to the entire sled frame 300. Once the first hydraulic actuator 306 reaches full retraction the weight of the sled frame and associated operational equipment is positioned over the first bogie 28.

When the sled frame 300 is traversing along the weldment tracks 280, 282 the nylon friction pads 334, 336, 338 secured to the sled pad plates 330 by the retaining blocks 332 at the six locations (three on each side of the sled frame 300) glide along the outboard side of the weldment tracks. The nylon friction pads are restrained in position as they are positioned beneath the upper flange 293 of the weldment tracks. The load from the sled frame 300 and the associated equipment mounted to the sled frame is transferred primarily to the nylon friction pad 334 resting atop the lower flange 292 of the weldment tracks 280, 282. The nylon friction pads serve to minimize the frictional resistance associated with moving a heavy load across a surface.

Although the invention has been described above with reference to one or more preferred embodiments, it will be appreciated that various changes or modifications may be made without departing from the scope of the invention as defined in the appended claims.

We claim:

1. A method of operating a railcar moving vehicle, the method comprising;
   fabricating a truck comprising;
   (a) a cab;
   (b) frame rails;
   (c) at least one drive axle with at least one rubber drive tire at each end of the drive axle;
   (d) a pair of steering wheels with a corresponding steering axle;
   (e) longitudinally extending support members mounted to the frame rails;
   (f) a first bogie with at least one wheelset, the first bogie mounted either (i) to the support members between the steering axle and the at least one drive axle, or (ii) to the frame rails forward of the steering wheels, the first bogie repositionable between an elevated highway mode and a lowered on-railroad track mode;
   (g) a second bogie with at least one wheelset, the second bogie mounted to the support members rearward of the drive axle, the second bogie configured to be repositionable between the highway mode and the on-railroad track mode;
   (h) a weighted sled frame slidably mounted to the support members, the weighted sled frame repositionable along substantially the entire longitudinal extent of the support members; and
   (i) a coupler configured to vertically actuate;
   driving the railcar moving vehicle with the first and second bogies in highway mode to a railroad crossing;
   locating the second bogie over the railroad tracks associated with the railroad crossing;
   repositioning the at least one wheelset of the second bogie onto the railroad tracks;
   moving the weighted sled frame to a rearmost position on the support member to shift weight away from the pair of steering wheels;
   lowering the second bogie wheelset to engage the railroad tracks and elevating the support members and frame rails;
   moving the rear of the vehicle with the second bogie to parallelism with the railroad tracks and aligning with the use of the steering tires, the first bogie over the railroad tracks;
   lowering the at least one wheelset of the first bogie to on-railroad track mode to raise the steering tires off the railroad tracks;
   repositioning the weighted sled frame along the length of the support member to optimize load balancing to minimize slippage of the wheelsets of the first and second bogies;
   transiting the vehicle to the location of at least one of (i) a rail car and (ii) a locomotive to be towed;
   coupling the railcar moving vehicle with the coupler to at least one of (i) the locomotive and (ii) the railcar;
   raising the coupler to transfer weight to the second bogie;
   repositioning the weighted sled frame along the length of the support member to optimize total towing capacity; and
   pulling the at least one railcar or locomotive to a desired location.

2. The method of operating the railcar moving vehicle of claim 1, wherein actuators reposition the first and second bogies between highway mode and the on-railroad track mode positions.

3. The method of operating the railcar moving vehicle of claim 1, wherein operational equipment comprises a significant portion of the weight applied to the sled frame.

4. The method of operating the railcar moving vehicle of claim 3, wherein the actuatable coupler transfers weight from the at least one railcar to the second bogie thereby increasing the tractive force of the wheelset of the second bogie.

5. The method of operating the railcar moving vehicle of claim 4, wherein the weighted sled frame is positionable over the first bogie to further increase the tractive force of the wheelset of the first bogie.

6. The method of operating the railcar moving vehicle of claim 1, wherein when in on-railroad track mode the wheelsets may optionally be (i) driven by a drive motor, or (ii) in freewheel mode without any drive power supplied by the drive motor.

7. The method of operating the railcar moving vehicle of claim 1, wherein when in on-railroad track mode the vehicle may operate (i) with the rubber drive tires engaged with the railroad tracks while the wheelsets are driven by the drive motor to maximize pulling power, (ii) with the rubber drive tires engaged with the railroad tracks while the wheelsets are in freewheel mode to increase the speed of the vehicle on the tracks, and (iii) with the rubber drive tires out of contact with the railroad tracks.

* * * * *